United States Patent [19]

Okazaki

[11] Patent Number: 5,193,093
[45] Date of Patent: Mar. 9, 1993

[54] DATA TRANSFER PROCESS WITH LOOP CHECKING

[75] Inventor: Katsuyoshi Okazaki, Ebina, Japan

[73] Assignee: Fujitsu Limited, Kawasaki, Japan

[21] Appl. No.: 470,793

[22] Filed: Jan. 26, 1990

[30] Foreign Application Priority Data

Jan. 27, 1989 [JP] Japan .................................. 1-018422

[51] Int. Cl.$^5$ ............................................. G06F 11/00
[52] U.S. Cl. ...................................... 371/34; 371/20.5
[58] Field of Search ........................ 371/34, 32, 20.5; 364/240.9, 241.1, 265.1

[56] References Cited

U.S. PATENT DOCUMENTS

| | | | |
|---|---|---|---|
| 3,228,000 | 1/1966 | Collis | 371/34 |
| 3,336,576 | 8/1967 | Sourgens | 371/34 |
| 3,453,592 | 7/1969 | Ishii et al. | 371/34 |
| 4,070,648 | 1/1978 | Mergenthaler et al. | 371/34 |
| 4,271,513 | 6/1981 | Maejima et al. | 371/34 |

FOREIGN PATENT DOCUMENTS

| | | | |
|---|---|---|---|
| 0164654 | 12/1981 | Japan | 371/34 |
| 0237544 | 10/1986 | Japan | 371/34 |
| 1001179 | 8/1965 | United Kingdom | 371/34 |

OTHER PUBLICATIONS

IBM Technical Disclosure Bulletin, Maiwald et al., "Error Recovery in Data Transmission" vol. B, No. 10, Mar. 1971.

Primary Examiner—Robert W. Beausoliel
Assistant Examiner—Allen M. Lo
Attorney, Agent, or Firm—Staas & Halsey

[57] ABSTRACT

A data transfer process for transferring data from a first system to a second system while carrying out loop checking, including: a first step for sending out a part of the above data from the first system to the second system; a second step for sending first information that the part of the data has been sent out from the first system to the second system; a third step for receiving the above part of the data in the second system; a fourth step for sending out the part of the data, which has been received in the third step from the second system to the first system; a fifth step for sending second information that the part of the data has been sent out from the second system in the fourth step, a sixth step for receiving the part of the data, which has been sent from the second system, in the first system; a seventh step for determining whether or not the data which has been sent out from the first system in the first step and the data which has been received in the second system in the sixth step are equal; and an eighth step for resending the part of the data which has been sent out from the first system in the first step to the second system when the data compared in the seventh step.

15 Claims, 13 Drawing Sheets

Fig. 11

| | |
|---|---|
| INVERT | $b_0$ |
| " | $b_1$ |
| " | $b_2$ |
| ⋮ | ⋮ |
| INVERT | $b_7$ |
| " | $b_0$ & $b_1$ |
| " | $b_0$ & $b_2$ |
| ⋮ | ⋮ |
| INVERT | $b_0$ & $b_7$ |
| " | $b_1$ & $b_2$ |
| " | $b_1$ & $b_3$ |
| ⋮ | ⋮ |
| INVERT | $b_1$ & $b_7$ |
| ⋮ | ⋮ |
| INVERT | $b_i$ & ⋯ & $b_j$ |
| ⋮ | ⋮ |
| INVERT | All BITS |

Fig. 13

| ORIGINAL DATA | b0 | b1 | b2 | b3 | b4 | b5 | b6 | b7 |
|---|---|---|---|---|---|---|---|---|

SHIFT ONE BIT TO LEFT

| ONE BIT SHIFTED DATA | b1 | b2 | b3 | b4 | b5 | b6 | b7 | b0 |
|---|---|---|---|---|---|---|---|---|

SHIFT ONE BIT TO LEFT

| TWO BIT SHIFTED DATA | b2 | b3 | b4 | b5 | b6 | b7 | b8 | b9 |
|---|---|---|---|---|---|---|---|---|

⋮

| SEVEN BIT SHIFTED DATA | b7 | b0 | b1 | b2 | b3 | b4 | b5 | b6 |
|---|---|---|---|---|---|---|---|---|

Fig. 14

BROKEN BIT ↓

| | | | | | | | | |
|---|---|---|---|---|---|---|---|---|
| 1ST TRANSFERRED | 0 | 0 | 0 | 0 | 0 | 0 | 1 | 1 |
| 2ND TRANSFERRED | 0 | 0 | 0 | 0 | 0 | 0 | 1 | 0 |
| ⋮ | 0 | 0 | 0 | 0 | 0 | 1 | 1 | 0 |
| ⋮ | 0 | 0 | 0 | 0 | 1 | 0 | 1 | 0 |
| ⋮ | 0 | 0 | 0 | 1 | 0 | 0 | 1 | 0 |
| ⋮ | 0 | 0 | 1 | 0 | 0 | 0 | 1 | 0 |
| ⋮ | 0 | 1 | 0 | 0 | 0 | 0 | 1 | 0 |
| 8TH TRANSFERRED | 1 | 0 | 0 | 0 | 0 | 0 | 1 | 0 |

DATA TRANSFER PROCESS WITH LOOP CHECKING

BACKGROUND OF THE INVENTION (1) Field of the Invention

The present invention relates to a data transfer process with a loop (echo) checking, which is particularly useful in a transfer operation of a large amount of data between two data processing systems.

(2) Description of the Related Art

In a data transfer process including loop checking, data which has been sent out from a first system and received in a second system is sent back from the second system to the first system. The first system receives the returned data, and compares the returned data with the data which was first sent out from the first system. Thus, if the data and the returned data are not equal, it means that the data sent out from the first system may have not been correctly received by the second system.

Usually, an amount of data which is to be transferred from one system to the other system, exceeds an amount which can be transferred in one transfer operation, i.e., a plurality of transfer operations must be successively carried out between the two systems, and accordingly, a plurality of transfer back operations must be carried out in a data transfer process with loop checking.

In the conventional data transfer process with loop checking, first, the above-mentioned successive data transfer operations from one system to the other system are carried out. Secondly, successive transfer back operations of the data are carried out, and thirdly, the above comparison is carried out for all the data.

However, the timing of an output of data from one system must be informed to the other system, and the timing of a data reception in one system must be informed to the other system, in each data transfer operation during the above successive data transfer operations and the above successive transfer back operations.

Therefore, when the number of the above plurality transfer operations is N, a time necessary for informing the timing of an output of data in one system to the other system in each data transfer operation is T1, and a time necessary for informing the timing of a data reception in one system to the other system in each data transfer operation is T2, it takes $N \cdot (T1 + T2)$ for the above operations for informing the timings of data outputs and data receptions during the above successive data transfer operations. Accordingly, it takes $2N \cdot (T1 + T2)$ for the above operations for informing the timings of data outputs and data receptions during the above successive data transfer operations and the above successive transfer back operations.

Namely, in the conventional data transfer process with loop checking, the data transfer time is long. In particular, when the amount of data transferred is large, i.e., the above number N is large, the conventional data transfer process with loop checking causes a great delay in data processing.

In addition, a sequence for determining which system is a sender and which system is a receiver is necessary before the above successive data transfer operations and before the above successive transfer back operations.

Further, in the conventional data transfer process with loop checking, if the data returned from the second system to the first system is not equal to the data first sent from the first system to the second system, i.e., when it is determined that the data sent out from the first system may have not been correctly received in the second system, the data first sent to the second system is re-sent to the second system.

When the above incorrect reception is due to transient cause, e.g., a transient noise, the re-sent data is expected to be correctly received in the second system. However, when the above incorrect reception is due to a lasting cause, e.g., a break of a part or all of the data transmission lines, the re-sent data will not be correctly received in the second system, and the correct data cannot be recognized in the second system, if the re-sent data is the same as the data firstly sent.

SUMMARY OF THE INVENTION

An object of the present invention is to provide a data transfer process with loop checking, wherein the total time necessary to transfer data from one system to the other system is reduced when an amount of data which is to be transferred from one system to the other system exceeds an amount of data which can be transferred in one transfer operation.

Another object of the present invention is to provide a data transfer with loop checking, wherein a receiver side system is able to recognize correct data through a finite number of data resending operations, when some bits in a data transmission path between both the systems, are in a state of lasting failure.

According to the first aspect of the present invention, there is provided a data transfer process for transferring data from a first system to a second system with carry-out loop checking, including the following steps: a first step for sending out a part of the above data from the first system to the second a second step for sending first information that indicates the above part of the data has been sent in the first step, from the first system to the second system: a third step for receiving the above part of the data in the second system; a fourth step for sending out the above part of the data which has been received in the third step, from the second system to the first system, a fifth step for sending second information that indicates the above part of the data has been sent in the fourth step, from the second system to the first system; a sixth step for receiving the above part of the data which has been sent from the second system, in the first system; a seventh step for determining whether or not the data which has been sent out from the first system in the first step and the data which has been received in the second system in the sixth step are equal; and an eighth step for resending the above part of the data which has been sent out from the first system in the first step to the second system when it is determined, in the seventh step, that the part of the data which has been sent out from the first system in the first step and the part of the data which has been received in the first system in the sixth step are not equal. The above first to eighth steps are repeated for another part of the above data until all of the above data has been transferred to the second system.

Namely, according to the first aspect of the present invention, a plurality of data transfer back operations from the second system to the first system, which are necessary for loop checking, are each incorporated in a corresponding cycle of the successive data transfer o from the first system to the second system. The data transfer back operations are carried out and synchronized with the successive data transfer operations from the first system to the second system. That is, the data transfer back operations from the second system to the first system are carried out using the procedures comprised of the above first and second information sending steps. These steps are primarily provided for synchronizing the first and second systems regarding the timings of data sending and receiving in the data transfer operation from the first system to the second system. No additional procedure for synchronizing the first and second systems regarding the timings of data sending and receiving in the data transfer back operation for second system to the first system is necessary. Thus, the total necessary time for the data transfer operation including a loop checking operation, is reduced.

According to the second aspect of the present invention, a data transfer process with loop checking comprising the above first eight steps of the the present invention, and wherein the eighth step includes the following steps: a ninth step for transforming a part of the above data which has been sent out in a preceding sending operation from the first system to the second system, in a predetermined manner; a tenth step for sending out the above part of the data, which has been transformed last in the ninth step, from the first system to the second eleventh step for sending third information that indicates the above part of the data has been sent out from the first system in the tenth step to the second system; a twelfth step for receiving the above part of the data which has been sent from the first system in the tenth step, to the second system; a thirteenth step for sending out the above part of the data, which has been received in the eleventh step, from the second system to the first system; fourteenth step for sending fourth information that indicates the above part of the data has been sent out from the second system in the twelfth step to the first system; a fifteenth step for receiving the above part of the data, which has been sent from the first system in the tenth step, in the second system; a sixteenth step for determining whether or not the data which has been sent out from the first system in the ninth step and the data which has been received in the second system in the fifteenth step are equal; a seventeenth step for proceeding to the ninth step when the data which has been sent out from the first system in the ninth step and the data which has been received in the second system in the fifteenth step are not equal; and an eighteenth step for proceeding to the first step when the data which has been sent out from the first system in the ninth step and the data which has been received in the second system in the fifteenth step are equal. The above transformation in the ninth step is carried out so that another possible bit pattern, is generated by the transformation. Another bit pattern can be generated from the above part of the data by on or more faults in a transmission line through which a part of the data is sent from its own system to the other system and in a transmission line through which a part of data is sent from the other system to its own system.

According to the third aspect of the present invention, a data transfer process with loop check comprising the first eight steps of the present invention, and wherein, the above eighth step includes the following steps: a ninth step for generating all possible bit patterns which can be generated by cyclic bit shifting operations from the above part of the data; a tenth step for sending out the above all possible bit patterns, which are generated in the ninth step, from the first system to the second system; an eleventh step for receiving all the possible bit patterns, which have been sent from the first system in the tenth step, in the second system; a twelfth step for determining whether or not the above part of data, which has been sent out from the first system in the first step, can be correctly recognized based on the data which is received in the eleventh step; a thirteenth step for proceeding to the ninth step when the above part of data, which has been sent out from its own system by the first step, cannot be correctly recognized based on the data which is sent by the ninth step; and a fourteenth step for proceeding to the first step when the above part of data, which has been sent out from its own system by the first step, can be correctly recognized based on the data which is sent by the ninth step.

BRIEF DESCRIPTION OF THE DRAWINGS

In the drawings:

FIG. 11 is an illustration of data transformations in the data resending process of the first mode;

FIG. 12 is a flowchart of a data transfer process including loop checking and data resending of the second mode and FIGS. 13 and 14 are illustrations of data transformations in the data resending process of the second mode.

DESCRIPTION OF THE PREFERRED EMBODIMENTS

Figure 1:
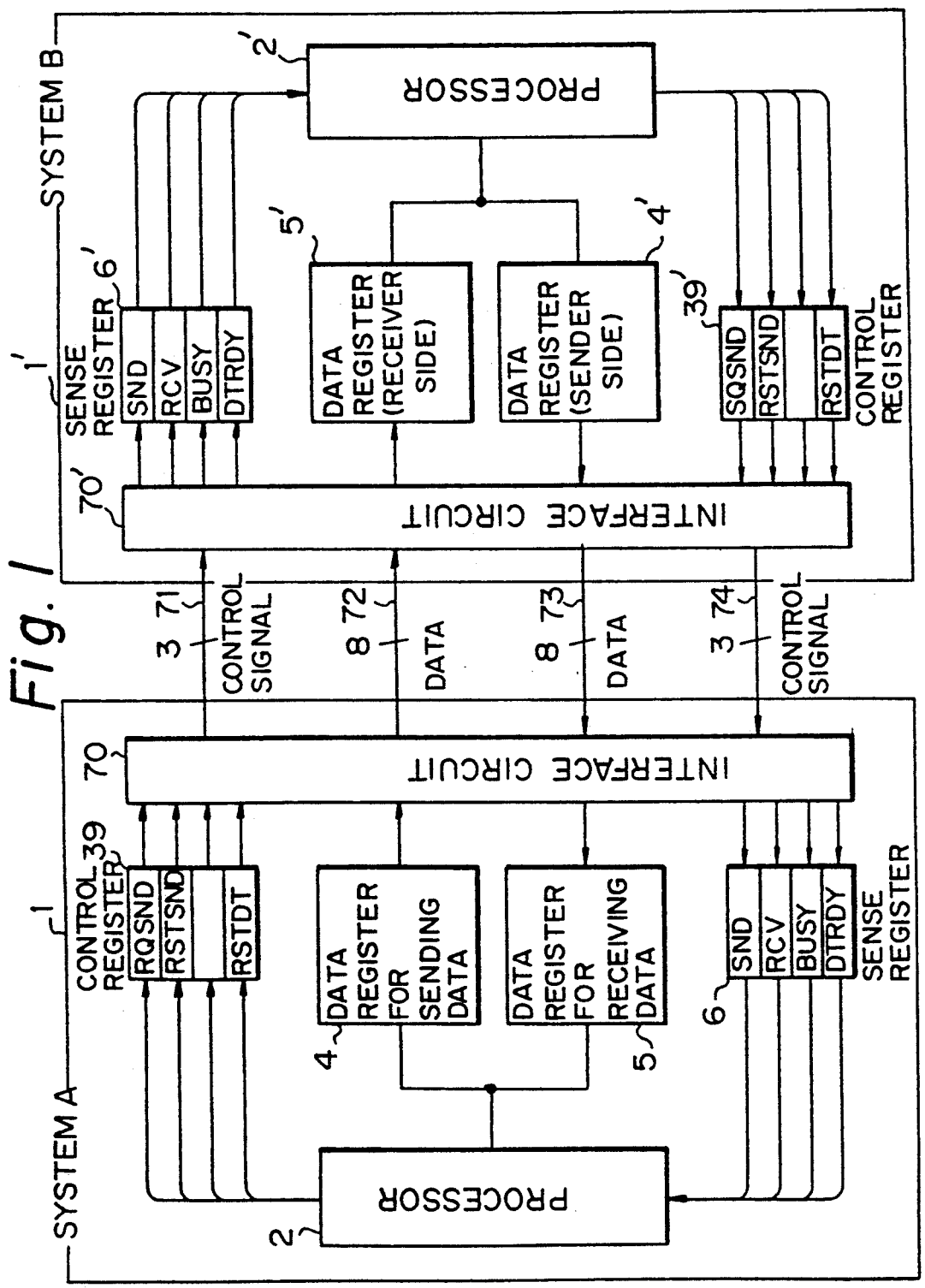
FIG. 1 is a black diagram illustrating a construction for a data transfer between two systems in the first embodiment of the present invention.

FIG. 1 shows an outline of a construction for a data transfer between two systems in a first embodiment of the present invention.

In FIG. 1, reference numerals 1 and 1' denote data processing systems A and B between which data transfer using the data transfer process with loop checking according to the present invention is carried out. In the system A, reference numeral 2 denotes a processor, 4 denotes a data register for sending data, 5 denotes a data register for receiving data, 6 denotes a sense register 39 denotes a control register, and 70 denotes an interface circuit. In the the system B, the same reference numerals as the components in the system A each with a prime ('), denote the same component. Reference numerals 71, 72, 73, and 74 each denote a transmission line.

Data is transferred from the processor 2 in the system A to the processor 2' in the system B. In such a data transfer, in particular, a large amount of data transfer is required, for example, when an operation is switched from a system in operation to a stand-by system.

Data which is to be sent to the processor 2' in the other system is written in the data register 4 for sending data by the processor 2 in its own system. The output of the data register 4 is sent to the other system B through the interface circuit 70 and the transmission line 72.

Data sent back from the system B is received in the system A through the transmission line 73 and the interface circuit 70, and is written in the data register 5 for receiving data. The data written in the data register 5 is read by the processor 2 at a timing explained later.

As shown in FIG. 1, the control register 39 has three bits: RQSND for indicating that the processor has a request for sending data to the other processor; RSTSND for indicating that the processor ceases sending data to the other processor; and RSTDT for indicating that the processor has received data in the data register 5 for receiving data. The status of the control register 39 is transmitted to the other system as control signals through the interface circuit 70 and the transmission line 71.

The sense register 6 has four bits: SND for indicating that the processor is in the state for sending data to the other processor; RCV for indicating that the processor is in the state for receiving data from the other processor; BUSY for indicating that the processor has written data which is to be sent to the other processor, in the data register 4 for sending data; and DTRDY for indicating that data is output from the other processor. The content of the sense register 6 is renewed by outputs of the interface circuit 70 based on the status of the control register 4 in its own system A and the control signals sent from the other system B through the transmission line 74.

The detailed construction and the functions of the interface circuit 70 other than mentioned above, are explained later.

In the system B, each component with the same reference numeral as the components in the system A together with a prime (') function the same.

Figure 2:
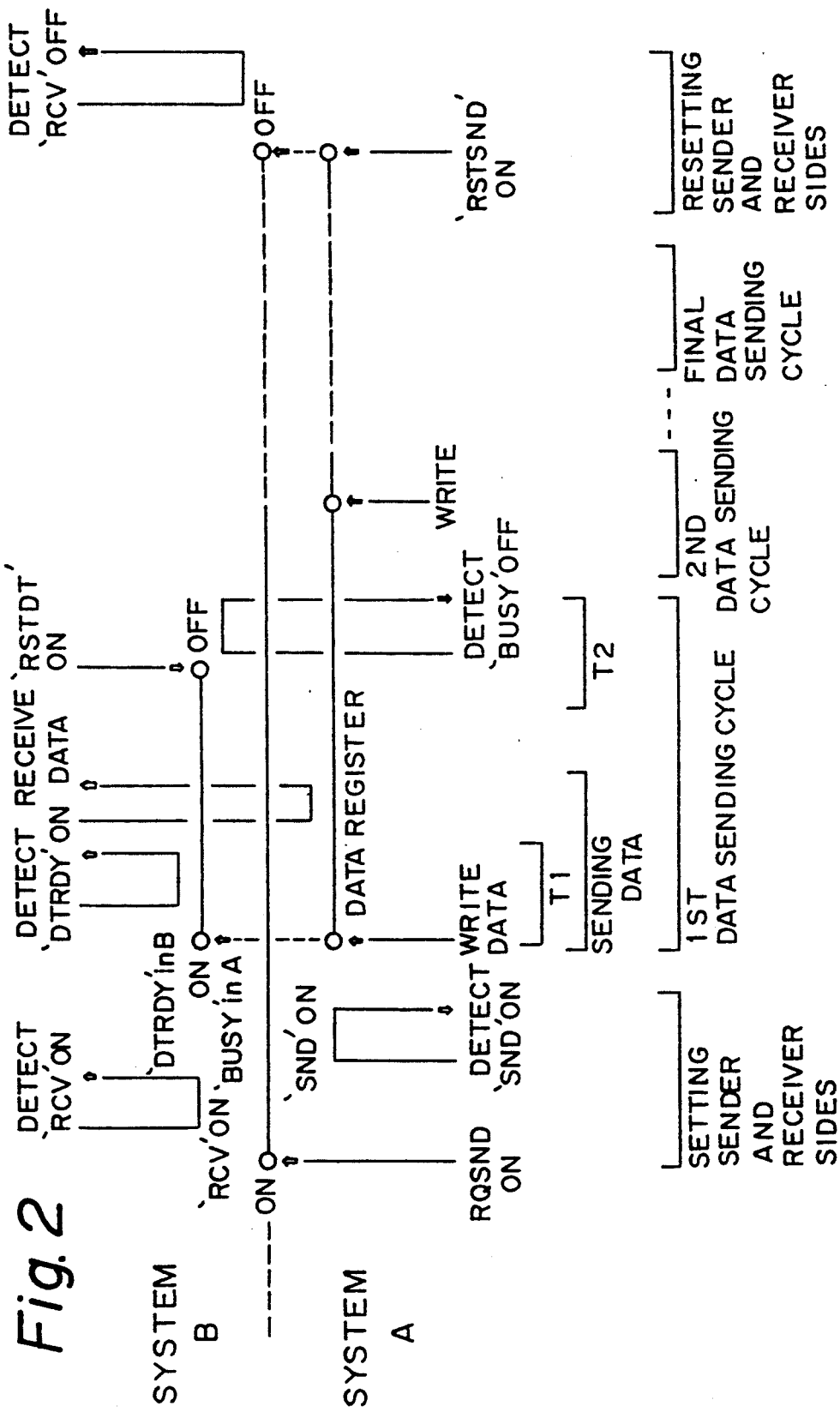
FIG. 2 is a timing diagram in successive data transfer operations in the construction of FIG. 1.

FIG. 2 shows a timing diagram in successive data transfer operations in the construction of FIG. 1. Successive data transfer operations from the processor 2 in the system A to the processor 2' in the system B without a loop checking operation are carried out as follows.

As shown in FIG. 2, first, the processor 2 writes "1" in the bit RQSND in the control register 39. After a priority control operation between possible requests for sending data from the processors 2 and 2' in both the systems A and B, which is carried out in the interface circuit 70 and is explained later, when the request for sending data from the processor 2 is accepted, "1" is written in the bit SND in the sense register 6 in its own system A, and in the bit RCV in the sense register 6' in the system B through the transmission line 71.

In the case where the processor 2' is carrying out another data processing in parallel with the data transfer (receiving) operation, the processor 2' periodically checks the bit RCV in the sense register 6' in the system B in the intervals of the other data processing, and detects the "1" state of the bit RCV in the sense register 6' in the system B.

In the case where the processor 2 is carrying out another data processing in parallel with the data transfer operation, the processor 2 periodically checks the bit SND in the sense register 6 in its own system A in the intervals of the other data processing, after the above writing operation of the bit RQSND in the control register 39. When the processor 2 detects the state "1" in the bit SND in the sense register 6 in its own system A, the processor 2 writes data which is to be sent in the first data transfer operation, in the data register 4. The data written in the data register 4 is transmitted through the transmission line 72 to the data register 5' in the other system B. Responding to the above data writing in the data register 4, "1" is set in the bit BUSY in the sense register 6 in its own system A, and "1" is also set in the bit DTRDY in the sense register 6' in the system B through the interface circuit 70 and the transmission line 71.

In the case where the processor 2' is carrying out another data processing in parallel with the data transfer (receiving) operation, the processor 2' periodically checks the bit DTRDY in the sense register 6' in the system B in the intervals of the other data processing, after the above detection of the bit RCV in the sense register 6'. When the processor 2' detects the state "1" in the bit DTRDY in the sense register 6' in the system B, the processor 2' in the system B reads the data in the data register 5', and sets "1" in the bit RSTDT in the control register 39' in the system B. The "1" state of the bit RSTDT in the control register 39' in the system B is informed through the transmission line 74 to the system A. Responding to the "1" state of the bit RSTDT in the control register 39' in the system B, the bit BUSY in the sense register 6 in the system A is reset to "0".

In the case where the processor 2 is carrying out another data processing in parallel with the data transfer operation, the processor 2 periodically checks the bit BUSY in the sense register 6 in its own system A in the intervals of the other data processing, after the above writing operation of the data in the data register 4. When the processor 2 detects the state "0" in the bit BUSY in the sense register 6 in its own system A, the processor 2 writes data which is to be sent in the next data transfer operation, in the data register 4. Thus, the next data transfer operation begins. Thereafter, the data transfer operations are repeated until the total amount of data which is to be sent to the system B has been sent.

When the processor 2 recognizes that the total amount of data which is to be sent to the system B has been sent, the processor 2 sets "1" in the bit RSTSND in the control register 39 in the system A. The "1" state of the bit RSTSND in the control register 39 in the system A is informed through the transmission line 71 to the system B. Responding to the "1" state of the bit RSTSND in the control register 39 in the system A, the "1" state of the bit RCV in the sense register 6' in the system B is reset to "0".

As explained before, in the conventional data transfer process with loop checking, first, the above-mentioned successive data transfer operations from one system to the other system are carried out. Secondly, successive transfer back operations of the data are carried out, and thirdly, the comparison is carried out for all the data. Namely, The sequence of the successive data transfer operations as shown in FIG. 2, is carried out first from the system A to the system B. and next from the system B to the system A.

Figure 3:
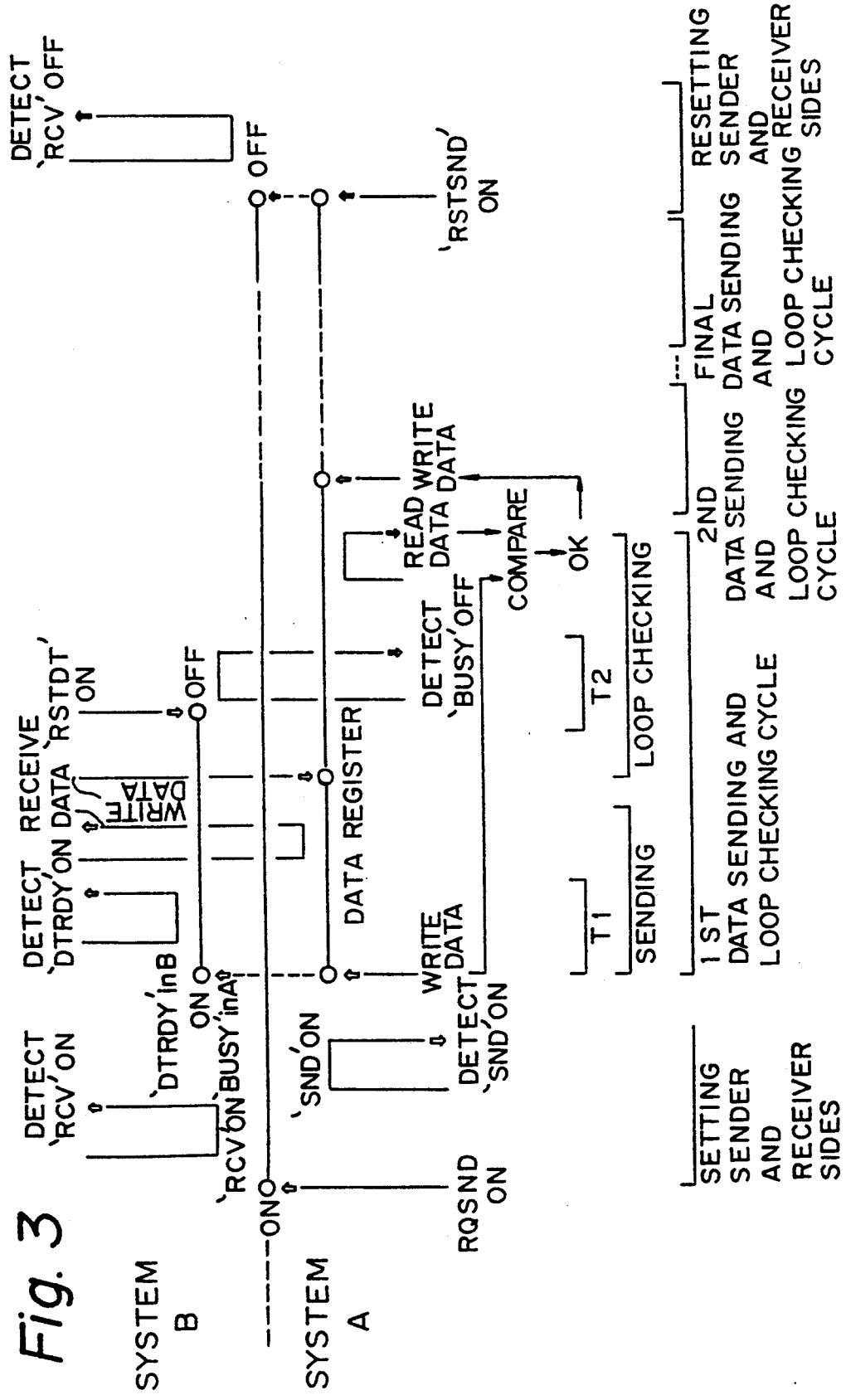
FIG. 3 is a timing diagram of a data transfer process with a loop checking sequence according to the present invention when the process is carried out in the construction of FIG. 1.

FIG. 3 shows a timing diagram in the loop checking sequence according to the present invention when it is applied to the construction of FIG. 1.

As shown in FIG. 3, first, the processor 2 writes "1" in the bit RQSND in the control register 39. After a priority control operation between possible requests for sending data from the processors 2 and 2' in both the systems A and B, which is carried out in the interface circuit 70 and is explained later, when the request for sending data from the processor 2 is accepted, "1" is written in the bit SND in the sense register 6 in its own system A, and in the bit RCV in the sense register 6' in the system B through the transmission line 71.

In the case where the processor 2' is carrying out another data processing in parallel with the data transfer (receiving) operation, the processor 2' periodically checks the bit RCV in the sense register 6' in the system B in the intervals of the other data processing, and detects the "1" state of the bit RCV in the sense register 6' in the system B.

In the case where the processor 2 is carrying out another data processing in parallel with the data transfer operation, the processor 2 periodically checks the bit SND in the sense register 6 in its own system A in the intervals of the other data processing, after the above writing operation in the bit RQSND in the control register 39. When the processor 2 detects the state "1" in the bit SND in the sense register 6 in its own system A, the processor 2 writes data, which is to be sent in the first data transfer operation, in the data register 4. The data written in the data register 4 is transmitted through the transmission line 72 to the data register 5' in the other system B. Responding to the above data writing in the data register 4, "1" is set in the bit BUSY in the sense register 6 in its own system A, and "1" is also set in the bit DTRDY in the sense register 6' in the system B through the interface circuit 70 and the transmission line 71.

In the case where the processor 2' is carrying out another data processing in parallel with the data transfer (receiving) operation, the processor 2' periodically checks the bit DTRDY in the sense register 6' in the system B in the intervals of the other data processing, after the above detection of the bit RCV in the sense register 6'. When the processor 2' detects the state "1" in the bit DTRDY in the sense register 6' in the system B, the processor 2' in the system B reads the data in the data register 5'. All the steps up to this step, are the same as the corresponding steps in the process as shown in FIG. 2.

However, according to the present invention, in the process of FIG. 3, the processor 2' in the system B writes the received data in the data register 4' in the system B for sending data in the system B, and then sets "1" in the bit RSTDT in the control register 39' in the system B. The data written in the data register 4' is transmitted back through the transmission line 73 to the data register 5 in the system A (transfer back operation). The "1" state of the bit RSTDT in the control register 39' in the system B is informed through the transmission line 74 to the system A. Responding to the "1" state of the bit RSTDT in the control register 39' in the system B, the "1" state in the bit BUSY in the sense register 6 in the system A is reset to "0".

In the case where the processor 2 is carrying out another data processing in parallel with the data transfer operation, the processor 2 periodically checks the bit BUSY in the sense register 6 in its own system A in the intervals of the other data processing, after the above writing operation of the data in the data register 4. When the processor 2 detects the state "0" in the bit BUSY in the sense register 6 in its own system A, the processor 2 reads the data in the data register 5, and compares the data in the data register 5 with the data which has been sent from the processor 2 to the processor 2' (loop checking operation). When these data are determined equal, the processor 2 writes data which is to be sent in the next data transfer operation, in the data register 4. Thus, the next data transfer operation with a loop checking operation begins. Thereafter, the data transfer operations with a loop checking operation are repeated until the total amount of data which is to be sent to the system B has been sent.

When the above data are determined not equal, the processor 2 resends the correct data to the processor 2' in the first embodiment of the present invention.

When the processor 2 recognizes that the total amount of data which is to be sent to the system B has been sent, the processor 2 sets "1" the bit RSTSND in the control register 39 in the system A. The "1" state of the bit RSTSND in the control register 39 in the system A is informed through the transmission line 71 to the system B. Responding to the "1" state of the bit RSTSND in the control register 39 in the system A, the "1" state of the bit RCV in the sense register 6' in the system B is reset to "0".

Hence, the total necessary time in the data transfer process with loop checking of FIG. 3 according to the present invention, is reduced when compared with the total necessary time in the conventional data transfer process with loop checking including successive data transfer operations from the processor 2 to the processor 2' shown in FIG. 2, the successive transfer back operations from the processor 2' to the processor 2 which are carried out in the sequence similar to FIG. 2, and the operation of comparing (checking) all the data transferred back and the original data.

In FIGS. 2 and 3, the aforementioned time necessary for informing the timing of an output of data in one system to the other system in each data transfer operation is T1, and a time necessary for informing the timing of a data reception in one system to the other system in each data transfer operation is T2.

As mentioned before, when the number of transfer operations which are required to transfer the entire amount of data is N, it takes $2N \cdot (T1+T2)$ for the above operations for informing the timings of data outputs and data receptions during the successive data transfer operations and the successive transfer back operations, in the above-mentioned conventional data transfer process with loop checking including successive data transfer operations from the processor 2 to the processor 2' shown in FIG. 2, the successive transfer back operations from the processor 2' to the processor 2 which is carried out in the sequence similar to FIG. 2, and the above operation of comparison (checking).

On the other hand, the total necessary time for the above operations for informing the timings of data outputs and data receptions during the data transfer process with loop checking of FIG. 3 according to the present invention, is $N \cdot (T1+T2)$ as shown in FIG. 3.

Namely, according to the present invention, the total necessary time for the above operations for informing the timings of data outputs and data receptions during the data transfer process with loop checking is reduced to half of the conventional data transfer process with loop checking. In particular, when the amount of data transferred is large, i.e., the above number N is large, the data transfer process with loop checking according to the present invention greatly reduces the delay in the total data transfer operation.

In addition, in the conventional data transfer process with loop checking, a sequence for determining which system is a sender and which system is a receiver, is necessary before the above successive data transfer operations and before the above successive transfer back operations, i.e., a sequence for determining which system is a sender and which system is a receiver must be carried out twice. Further, a sequence for informing a ceasing of the successive transfer operations is necessary after the above successive data transfer operations and after the above successive transfer back operations, i.e., a sequence for informing a ceasing of the successive transfer operations, must be carried out twice.

On the other hand, in the data transfer process with loop checking according to the present invention, the sequence for determining which system is a sender and which system is a receiver, and the sequence for informing a ceasing of the successive transfer operations including loop checking operations, are each carried out once during the whole data transfer operation with the loop checking. Thus, the necessary time is also reduced by half for these sequences in the data transfer process with loop checking according to the present invention.

Figure 4:
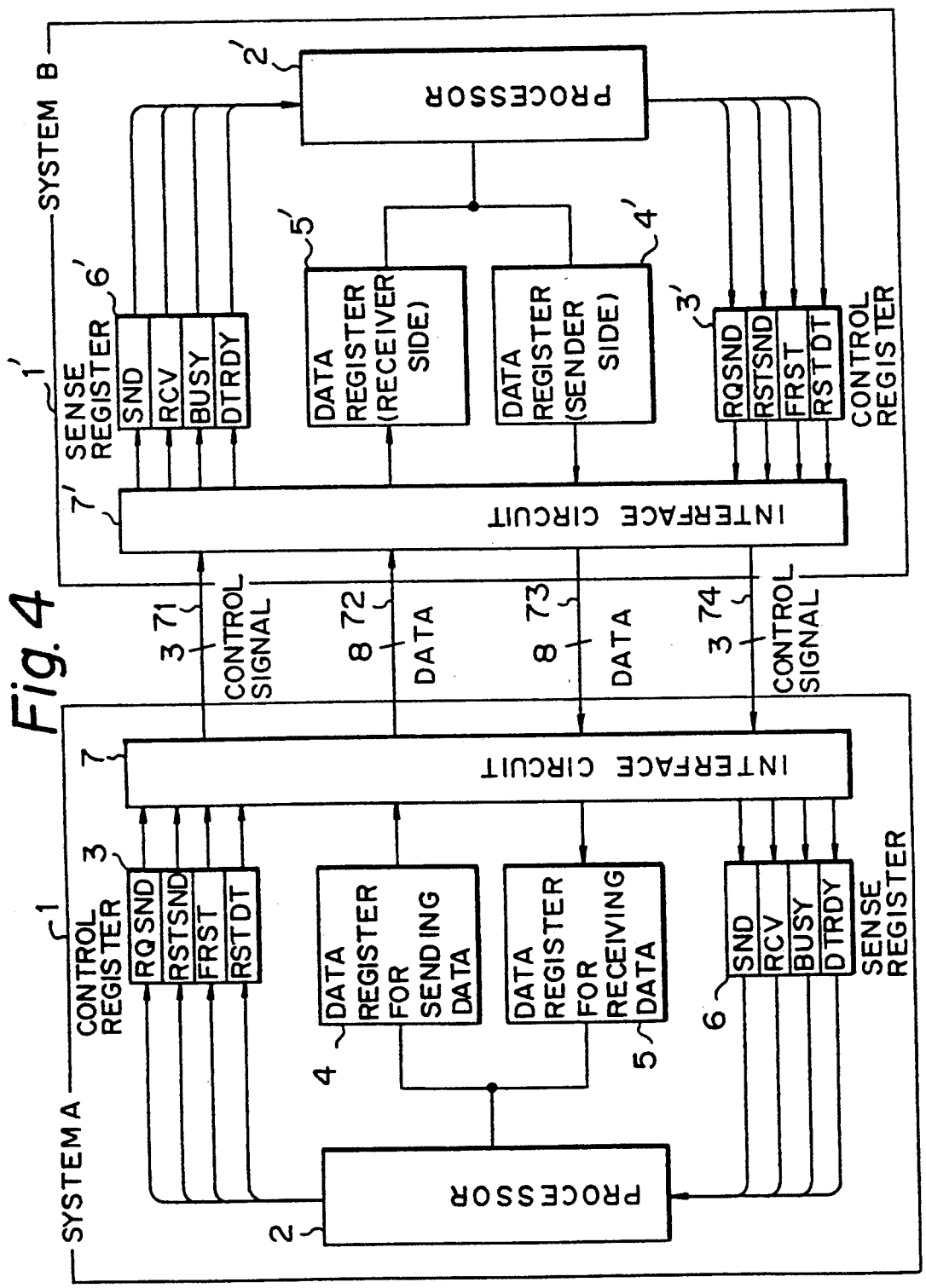
FIG. 4 is a block diagram illustrating a construction for a data transfer between two systems in the second embodiment of the present invention.

FIG. 4 shows an outline of a construction for a data transfer between two systems in the second embodiment of the present invention.

In FIG. 4, the components with the same reference numerals as the components in FIG. 1 each denote the same component. Reference numerals 3 and 3' each denote a control register, and 7 and 7' each denote an interface circuit in the corresponding one of the systems A and B.

The only difference in the control register 3 (3') in FIG. 4 from the control register 39 (39') in FIG. 1 is that the control register 3 (3') in FIG. 4 has a bit FRST in the control register 3 (3') in addition to the bits RQSND, RSTSND, and RSTDT. The construction and the functions of the interface circuit 7 (7') are different from the interface circuit 70 (70') in FIG. 1 only in the portions for handling signals relating the bit FRST.

The bit FRST in the control register 3 is provided for resetting both the systems A and B, which is used, in particular, for switching the system to a resending process in the second embodiment of the present invention, when it is determined that the data which has been sent to the other system and the data which is received from the other system corresponding to the sent data are not equal, as explained later.

The sequence of data transfer processing with loop checking in the second embodiment of the present invention, is the same as the sequence of the above-mentioned first embodiment of the present invention, except a resending operation is carried out in a different manner in the first embodiment of the present invention as explained later, when the data which has been sent from one system to the other system, and the data returned from the other system corresponding to the above sent data are determined to be different !rom each other in the loop checking.

The detailed construction and the functions of the interface circuit 7 (7') in FIG. 4 are explained below. The detailed construction and the functions of the interface circuit 70 (70') in FIG. 1 are the same as the detailed construction and the functions of the interface circuit 7 (7') in FIG. 4, except the portions (signal paths) relating the above bit FRST in the control register 3 are not provided therein. Since both the interface circuit 7 in the system A and interface circuit 7' in the system B are the same, the explanations below are made only for the interface circuit 7.

FIGS. 5, 6, 7, 8, and 9 show the detailed construction of the interface circuit 7 or 7' in the construction of FIG. 4.

Figure 5:
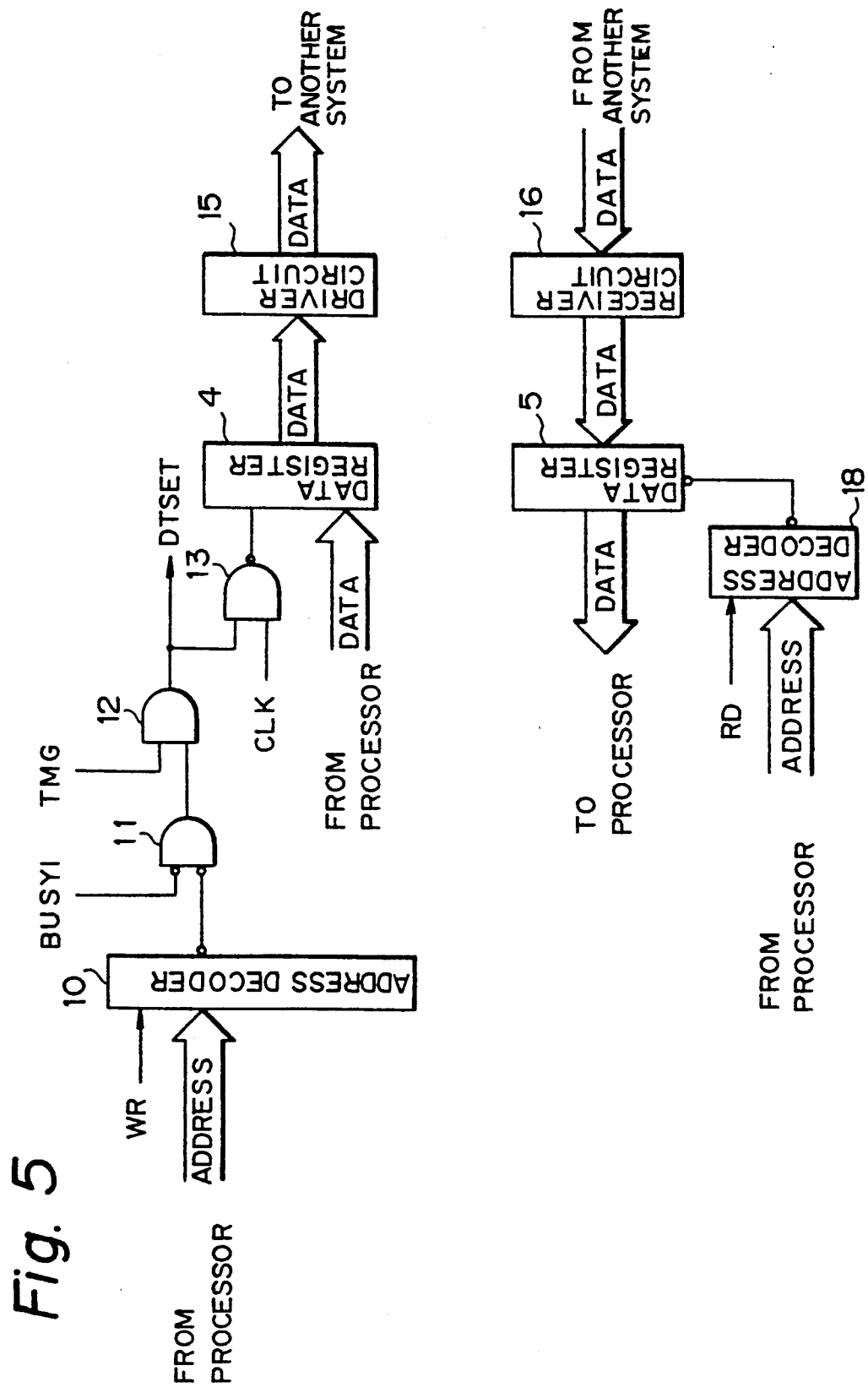
FIGS. 5, 6, 7, 8, and 9 are detailed block diagrams of the interface circuit 7 or 7' in the construction of FIG. 4;.

FIG. 5 shows the construction of the interface circuit 7 around the data registers 4 and 5.

In FIG. 5, reference numerals 10 and 18 each denote an address decoder, 11 and 12 each denote an AND gate, 13 denotes a NAND gate, 15 denotes a driver circuit, and 16 denotes a receiver circuit. The data registers 4 and 5 each are identical with the data registers having the same reference numerals in FIG. 4 (or FIG. 1).

A data signal from the processor 2 is applied to the data input terminal of the data register 4. The address decoder 10 receives an address signal and a write signal WR from the processor 2, and makes its negative logic output "0" (active in negative logic) when the address signal indicates the address of the data register 4 and the write signal WR is active. The output of the address decoder 10 is applied to one of the negative logic input terminals of the AND gate 11. A BUSY1 signal (explained later) is applied to the other negative logic input terminal of the AND gate 11. The output of the AND gate 11 is applied to one of the input terminals of the AND gate 12. A timing signal TMG (explained later) is applied to the other input terminal of the AND gate 12. The output of the AND gate 12 is denoted as a data set signal DTSET, and is applied to the one of the input terminals of the NAND gate 13. A clock signal CLK is applied to the other input terminal of the NAND gate 13. The negative logic output of the NAND gate 13 is applied to the data register 4 as a write enable signal which allows the data register 4 to input and hold data that is applied to the data register 4.

The output of the data register 4 is input to the driver circuit 15, and the output of the driver circuit 15 is out on the transmission line 72 in FIG. 4. The data register 4, the driver circuit 15, and the transmission line 72 each contains eight bits. Therefore, one byte of data is transferred to the other system 2' in one transfer operation.

The data transmitted from the other system 2' through the transmission line 73 is received in the receiver circuit 16, and the output of the receiver circuit 16 is input into the data register 5. The address decoder 18 receives an address signal and a read signal RD from the processor 2, and makes its negative logic output "0" (active in negative logic) when the address signal indicates the address of the data register 5 and the read signal RD is active. The output of the address decoder 18 is applied to the data register 5 as a read enable signal which allows the data register 5 to output the held data to the processor.

Figure 6:
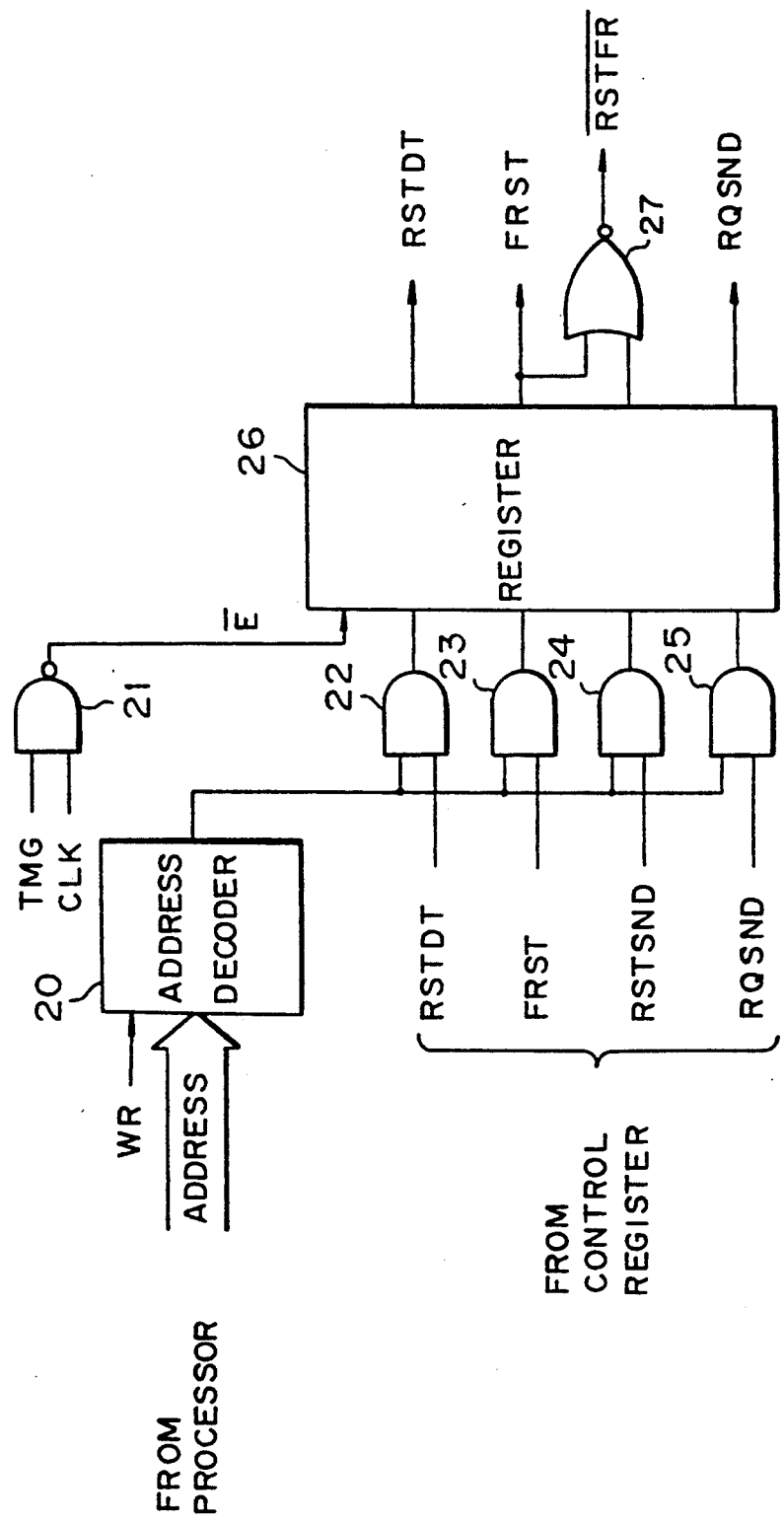

FIG. 6 shows the construction of the interface circuit 7 in the output side of the control register 3.

In FIG. 6, reference numeral 20 denotes an address decoder, 21 denotes a NAND gate, 22, 23, 24, and 25 each denote an 26 denotes a register, and 27 denotes an NOR gate.

Four bit outputs of the control register 3 corresponding to the aforementioned four bits RSTDT, RSTSND, FRST, and RQSND are each applied to one of the input terminals of the AND gates 22, 23, 24, and 25, respectively. The address decoder 20 receives an address signal and a write signal WR from the processor 2, and makes its output "1" (active) when the address signal indicates the address of the register 26 and the write signal WR is active. The output of the address decoder 20 is applied to the other input terminals of the AND gates 22, 23, 24, and 25. The outputs of the AND gates 22, 23, 24, and 25 are respectively applied to the register 26.

The NAND gate 21 receives the above-mentioned timing signal TMG and the clock signal CLK, and the output of the NAND gate 21 is applied to the register 26 as a write enable signal which allows the register 26 to input and hold signals which are applied to the register 26.

The four bit outputs of the register 26 each correspond to the four bit inputs of the register 26, and therefore, the four bits of the control register 3 respectively, and the same denotations RSTDT, RSTSND, FRST, and RQSND as the corresponding bits of the control register 3, are used for the output signals of the register 26.

The NOR gate 27 receives the output signals FRST and RSTSND of the register 26, and the output of the NOR gate 27 is denoted as $\overline{\text{RSTFR}}$.

Figure 7:
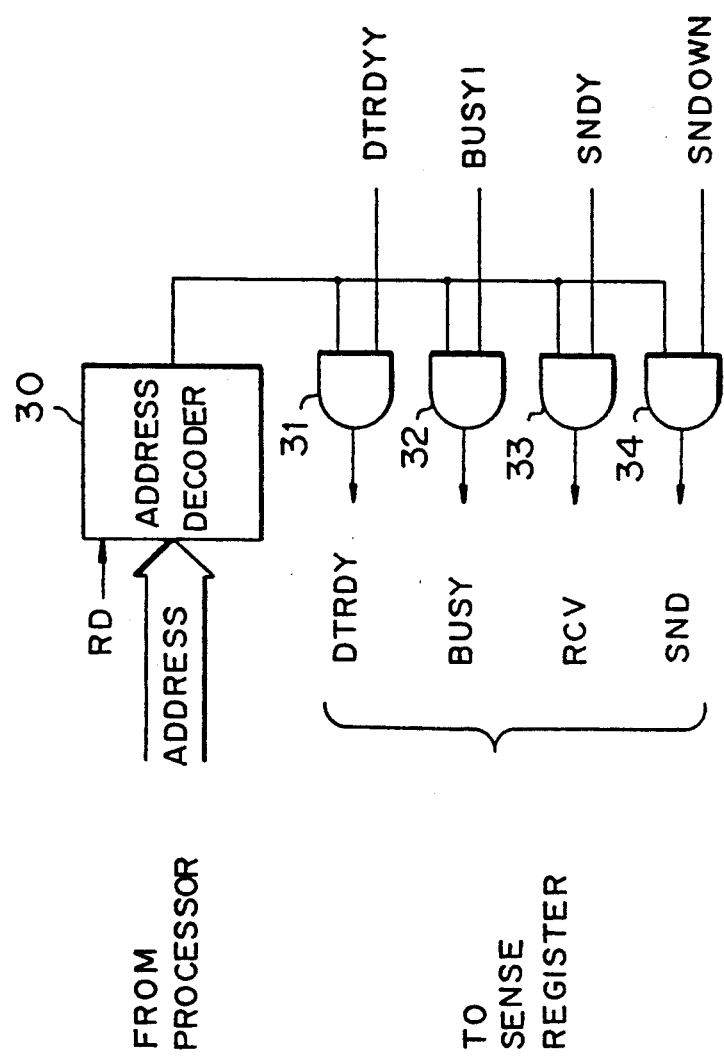

FIG. 7 shows the construction of the interface circuit 7 in the input side of the sense register 6.

In FIG. 7, reference numeral 30 denotes an address decoder, and 31, 32, 33, and 34 each denote an AND gate.

The address decoder 30 receives an address signal and a read signal RD from the processor, and makes its output "1" (active) when the address signal indicates the address of the sense register 6 and the read signal RD is active. The output of the address decoder 30 is applied to one of the input terminals of each of the AND gates 31, 32, 33, and 34. Signals each denoted by DTRDYY, BUSY1, SNDY, and SNDOWN (explained later), are each applied to the other terminal of the AND gates 31, 32, 33, and 34, respectively. Therefore, the active output of the address decoder 30 allows the above signals DTRDYY, BUSY1, SNDY, and SNDOWN to enter the corresponding bits of the sense register 6.

Figure 8:
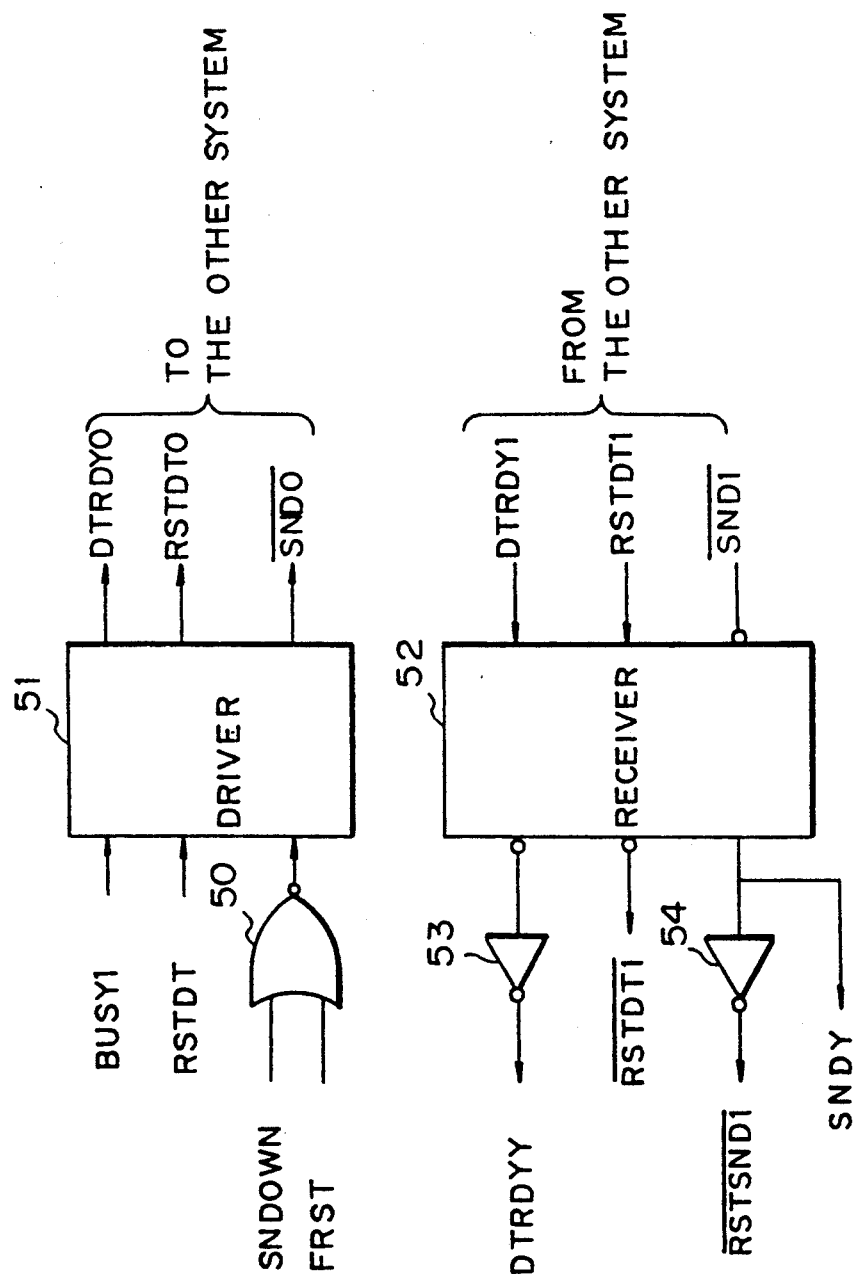

FIG. 8 shows the constructions of the interface circuit 7 around a driver for sending control signals to the other system, and a receiver for receiving control signals from the other system.

In FIG. 8 reference numeral 50 denotes an NOR gate, 51 denotes a driver, 52 denotes a receiver, and 53 and 54 each denote an inverter.

The driver 51 is provided for sending control signals to the other system, and the output terminals of the driver 51 are connected to the transmission line 71. The receiver 52 is provided for receiving control signals from the other system, and the input terminals of the receiver 52 are connected to the transmission line 74.

The NOR gate 50 receives the above-mentioned signals SNDOWN and FRST. The negative logic output of the NOR gate 50 is applied to one input terminal of the driver 51, and the output of the driver 51 corresponding to the output of the NOR gate 50 is denoted by $\overline{\text{SND0}}$. The above-mentioned signals BUSY1 and RSTDT are each input into the driver 51, and the outputs of the driver 51 corresponding to the signals BUSY1 and RSTDT are each denoted by DTRDY0 and RSTDT0, respectively. These output signals $\overline{\text{SND0}}$, DTRDY0, and RSTDT0 (these are the above-mentioned control signals) of the driver 51 are transmitted through the transmission line 71 to the system B.

The receiver 52 receives three input signals $\overline{\text{SND1}}$, DTRDY1, and RSTDT1 (these are the aforementioned control signals) from the other system B through the transmission line 74. These signals $\overline{\text{SND1}}$, DTRDY1, and RSTDT1 correspond to three output signals of a driver in the other system B, which corresponds to the driver 51 in the system A. As mentioned above, the interface circuit 7' in the system B has the same construction as the interface circuit 7 in the system A.

An output of receiver 52 corresponding to the signal $\overline{\text{SND1}}$, is denoted by SNDY, and the signal SNDY is inverted by the inverter 54. The output of the inverter 54 is denoted by $\overline{\text{RSTSND1}}$. Another output of the receiver 52 corresponding to the signal RSTDT1 is denoted by RSTDT1, and still another output (negative logic) of the receiver 52 corresponding to the signal DTRDY1 is inverted by the inverter 53. The output of the inverter 53 is denoted by DTRDYY.

Figure 9:
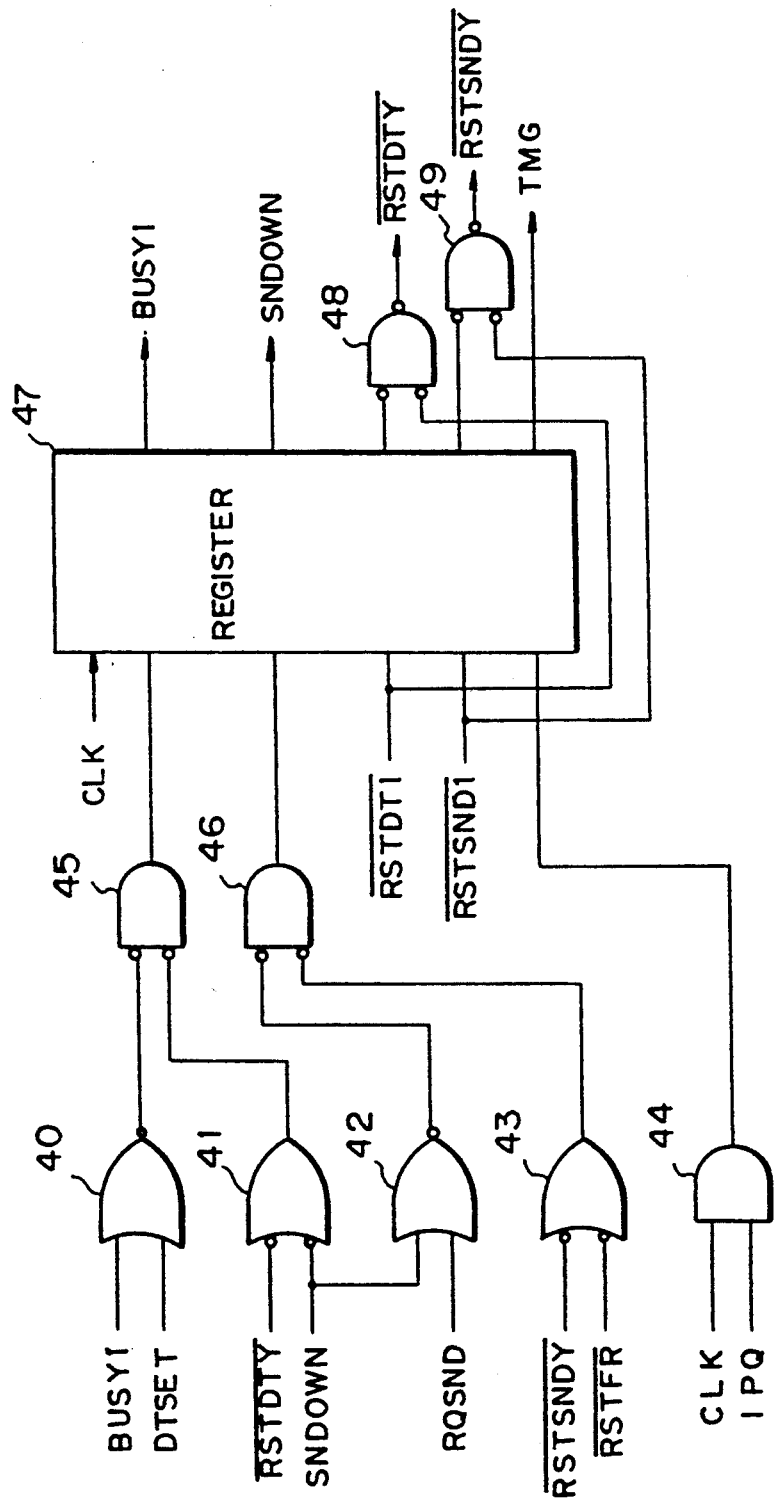

FIG. 9 shows the other portion of the interface circuit 7.

In FIG. 9, reference numeral 40 and 42 each denote a NOR gate, 48 and 49 each denote a NAND gate, 41 and 43 each denote an OR gate, 44, 45, and 46 each denote an AND gate, and 47 denotes a register.

The NOR gate 40 receives the aforementioned signals BUSY1 and DTSET, and the negative logic output of the NOR gate 40 is applied to one of the negative logic input terminals of the AND gate 45. The above signal BUSY1 is an output signal of the register 47 as explained later, and the above signal DTSET is the aforementioned output of the AND gate 12 shown in FIG. 5.

The OR gate 41 receives signals $\overline{\text{RSTDTY}}$ and SNDOWN at its own negative logic input terminals, and the output of the OR gate 41 is applied to the other negative logic input terminal of the AND gate 45. The above signals $\overline{\text{RSTDTY}}$ and SNDOWN are output signals of the register 47 as explained later.

The NOR gate 42 receives the aforementioned output signal RQSND of the register 26 (FIG. 6) and the above-mentioned signal SNDOWN. The output of the NOR gate 42 is applied to one of the negative logic input terminals of the AND gate 46.

The OR gate 43 receives signals $\overline{\text{RSTSNDY}}$ and $\overline{\text{RSTFR}}$ at its own negative logic input terminals, and the output of the OR gate 43 is applied to the other negative logic input terminal of the AND gate 46. The above signal $\overline{\text{RSTSNDY}}$ is an output signal of the register 47 as explained later, and the above signal $\overline{\text{RSTFR}}$ is the aforementioned output of the NOR gate 27 shown in FIG. 6.

The AND gate 44 receives the aforementioned clock signal CLK and an IPQ signal which is output from the processor 2 to provide a timing for each data transfer operation.

The register 47 inputs the outputs of the AND gates 45, 46, and 44, and the aforementioned signals RSTDT1 and RSTSND1 (which are the outputs of the receiver 52 and the inverter 54, respectively, as shown in FIG. 8) at a timing synchronized with the clock CLK.

The register 47 has the outputs corresponding to the above input signals, and one output BUSY1 corresponds to the output of the AND gate 45, another output SNDOWN corresponds to the output of the AND gate 46, and still another output TMG corresponds to the output of the AND gate 44. The outputs of the register 47 corresponding to the above inputs signals RSTDT1 and $\overline{\text{RSTSND1}}$, are each input into one of the negative logic input terminals of the NAND gates 48 and 49, respectively. The signals $\overline{\text{RSTDT1}}$ and $\overline{\text{RSTSND1}}$, are each input into the other negative logic input terminal of the NAND gates 48 and 49, respectively. The outputs of the NAND gates 48 and 49 are denoted by $\overline{\text{RSTDTY}}$ and $\overline{\text{RSTSNDY}}$, respectively.

The operation of the interface circuit 7 having the construction shown in FIGS. 5, 6, 7, 8, and 9 is explained below.

First, with reference to FIG. 6, when "1" is set in the bit RQSND in the control register 3 and the address of the register 26 and the write signal WR are output to the address decoder 20 shown in FIG. 6, the output of the bit RQSND is input into the register 26. The timing of the above input is given by the output of the NAND gate 21 to which a clock signal CLK and the aforementioned timing signal TMG are applied. The timing signal TMG is generated as an output of the register 47 shown in FIG. 9 corresponding to the output of the AND gate 44, to which the clock signal CLK and the IPQ signal from the processor 2 are applied.

The active output RQSND of the register 26 corresponding to the active output of the AND gate 25, is input into one input terminal of the NOR gate 42 shown in FIG. 9, and the active output of the NOR gate 42 is input into the register 47 through the AND gate 46, because, at this time, the signal SNDON which is applied to the other input terminal of the NOR gate 42 is "0" (inactive), both the signals $\overline{\text{RSTDTY}}$ and $\overline{\text{RSTSNDY}}$ are "1" (inactive), and therefore, the output of the OR gate 43 which is applied to the negative logic input terminal of the AND gate 46 together with the output of the NOR gate 42, is "0" (inactive).

Responding to the above active input from the AND gate 46 to the register 47, the output SNDOWN of the register 47 becomes active ("1"). This active signal SNDOWN is input into the OR gate 42, and the output of the AND gate 46 is fixed to active until either of the signals $\overline{\text{RSTDTY}}$ or $\overline{\text{RSTSNDY}}$ becomes active ("0"), and the output of the OR gate 43 becomes "1".

The above active signal SNDOWN is input into one of input terminals of the NOR gate 50 shown in FIG. 8, and the negative logic output of the NOR gate 50 is input into the driver 51. The output $\overline{\text{SND0}}$ of the driver 51 corresponding to the active output of the OR gate 50 is transmitted through one bit of the transmission line 71 to a receiver in the interface circuit 7' in the system B.

As the interface circuit 7' in the system B also has the same construction as the interface circuit 7 in the system A, the functions of the interface circuit 7' in the system B, responding to the above active output $\overline{\text{SNDO}}$ of the driver 51 in the system A which is transmitted from the system A to the system B through the transmission line 71, are explained with reference to FIGS. 5, 6, 7, 8, and 9.

The above active negative logic output $\overline{\text{SNDO}}$ of the driver 51 in the system A, which is transmitted through the transmission line 71, is received as the negative logic input signal $\overline{\text{SND1}}$ of the receiver 52 (shown in FIG. 8), in the interface circuit 7' in the system B. Responding to the above active negative logic input signal $\overline{\text{SND1}}$, the output signal SNDY of the receiver 52 becomes active ("1"), and the negative logic output $\overline{\text{RSTSND1}}$ of the inverter 54 becomes active ("0").

The above active output signal SNDY is applied to one of the input terminals of the AND gate 33 shown in FIG. 7. When the address of the sense register 6' and the read signal RD are applied to the address decoder 30 in the system B from the processor 2', the above active input signal SNDY sets the bit RCV in the sense register 6' in the system B to "1".

The above active output $\overline{\text{RSTSND1}}$ of the inverter 54 shown in FIG. 8, is input into both the negative logic input terminals of NAND gate 49, where one input is directly input and the other is input through the register 47. Thus, the negative logic output $\overline{\text{RSTSNDY}}$ of the NAND gate 49 becomes active after a predetermined delay through the register 47.

The above active negative logic signal $\overline{\text{RSTSNDY}}$ is input into one of the negative logic input terminals of the OR gate 43 shown in FIG. 9, an active ("1") output of the OR gate 43 responding to the above active input $\overline{\text{RSTSNDY}}$, is input into one of the negative logic input terminals of the AND gate 46, and thus, the output of the AND gate 46 is fixed to inactive ("0"), i.e., the aforementioned possible active input from the NOR gate 42 is inhibited at the AND gate 46 after the inactive input from the OR gate 43. Thus, a priority control between requests for sending data from both the systems A and B is carried out in the above construction.

Returning to the system A, as explained before with reference to FIG. 3, when the processor 2 in the system A detects the "1" state of the bit SND in the sense register 6, the processor 2 writes the data which is to be sent to the other system B, in the data register 4. The above data writing operation is carried out as explained below with reference to FIG. 5.

The processor 2 applies the data to the data input terminal of the data register 4, and inputs the address of the data register 4 and the write signal WR to the address decoder 10. Responding to the above inputs, the address decoder 10 outputs an active negative logic signal to one of the negative logic input terminals of the AND gate 11, while the "0" state of the BUSY1 signal is input into the other negative logic input terminal of the AND gate 11. Thus, an active signal is output from the AND gate 11 to the one input terminal of the AND gate 12.

At this time, an active IPQ signal is input into the AND gate 44 in FIG. 9, thereby the output signal TMG of the register 47 becomes active synchronized with the clock signal CLK, and thus, the active TMG signal is input into the other input terminal of the AND gate 12 shown in FIG. 5. Responding to the above inputs, the output signal DTSET of the AND gate 12 becomes active for a predetermined time. The active signal DTSET is input into one input terminal of the NAND gate 13, while the clock signal CLK is input into the other input terminal of the NAND gate 13. As the signal TMG is synchronized with the clock signal CLK, the output of the NAND gate 13 is applied to enable the data register 4 to input the above-mentioned applied data. Thus, the data is written in the data register 4, and the output of the data register 4 is transmitted through the driver circuit 15 and the transmission line 72 to the other system B.

The DTSET signal is also input into one of the input terminals of the NOR gate 40 in FIG. 9. As the BUSY1 signal is inactive at this time, the output of the NOR gate 40 becomes active responding to the above input of the active DTSET signal. The output signal of the NOR gate 40 is input into one of the negative logic input terminals of the AND gate 45, while a "0"0 signal from the OR gate 41 is input into the other negative logic input terminal of the OR gate 45 because the RSTDT input is "1" and the SNDOWN input is "1" at the OR gate 41. Therefore, the output signal of the AND gate 45 becomes active, and the active output signal is input into the register 47. The output BUSY1 of the register 47 corresponding to the output of the AND gate 45 becomes active, and the active BUSY1 signal is input into the above-mentioned terminal of the NOR gate 40. Thus, the active state of the BUSY1 signal is maintained in the loop circuit through the OR gate 40, the AND gate 41, and the register 47 until the $\overline{\text{RSTDTY}}$ which is input into the OR gate 41 becomes active ("0") as explained later.

The active BUSY1 signal is input into the driver 51 in FIG. 8, and the active output DTRDY0 of the driver 51 is transmitted through the transmission line 71 to the receiver in the interface circuit 7' in the system B.

The functions of the interface circuit 7' in the system B responding to the above active output DTRDY0 of the driver 51 in the system A, which is transmitted through the transmission line 71, are explained with reference to FIGS. 5, 6, 7, 8, and 9.

The above active output DTRDY0 of the driver 51 (shown in FIG. 8) which is transmitted through the transmission line 71, is received as an input signal DTRDY1 of the receiver 52 (shown in FIG. 8), in the interface circuit 7' in the system B. Responding to the above active input signal DTRDY0, the output DTRDYY of the inverter 53 becomes active ("1").

The active DTRDYY signal is input into one of the input terminals of the AND gates 31 in FIG. 7. When the address of the sense register 6, and the write signal WR are applied from the processor 2' to the address decoder 30, the output DTRDY of the AND gate 31 becomes active, and this is set in the bit DTRDY in the sense register 6.

As explained before with reference to FIG. 3, when the processor 2, in the system B detects the "1" state of the bit DTRDY in the sense register 3', the processor 2' inputs the address of the data register 5' (the reference numeral 5 without a prime (') is shown in FIG. 5 because FIG. 5 shows the construction of the interface circuit 7 for the system A) and the read signal RD to the address decoder 18. Responding the above inputs, the address decoder 18 outputs an active negative logic signal to the negative logic input terminals of the data register 5', which allows the data register 5' to input the data which has been received from the system A through the transmission line 72 and the receiver circuit 16. Thus, the data is output from the data register 5' to the processor 2'.

According to the sequence of FIG. 3, i.e., according to the present invention, after the processor 2' reads the received data in the data register 5', the processor 2' writes the received data in the data register 4' for transfer back the received data to the system A. For carrying out this transfer back operation, the aforementioned sequence of the data transfer operation is used, except that the aforementioned DTSET signal does not make the BUSY1 signal active because the SNDOWN signal which is input into the OR gate 41 is inactive, and therefore, an active signal cannot pass the AND gate 45.

According to the sequence of FIG. 3, the processor 2' next sets "1" in the bit RSTDT in the control register 3' in the system B. The output of the bit RSTDT in the control register 3' is input into one input terminal of the AND gate 22 shown in FIG. 6. When the address of the register 26 shown in FIG. 6 and the write signal WR are input into the address decoder 20 shown in FIG. 6 from the processor 2', and the aforementioned timing signal TMG is generated and input into the AND gate 21, the output of the bit RSTDT is input into the register 26. The output of the register 26 corresponding to the above output RSTDT is input into the driver 51 (FIG. 8) in the system B as an input signal RSTDT, and the output RSTDT0 of the driver 51 corresponding to the RSTDT input is transmitted through the transmission line 74 to the receiver 52 (shown in FIG. 8) in the system A.

Returning to the system A, the above transmitted RSTDT0 signal is received as an RSTDT1 signal in the receiver 52 shown in FIG. 8 in the system A. The receiver 52 outputs an active negative logic signal $\overline{\text{RSTDT1}}$ corresponding to the received RSTDT1 signal. The above active output $\overline{\text{RSTD1}}$ of the receiver 52, is input into both the negative logic input terminals of NAND gate 48 shown in FIG. 9, where one input is directly input and the other is input through the register 47. Thus, the negative logic output $\overline{\text{RSTDTY}}$ of the NAND gate 48 becomes active after a predetermined delay through the register 47.

The active ("0") signal $\overline{\text{RSTDTY}}$ is input into the OR gate 41 in FIG. 9, and a "1" signal is output from the OR gate 41 to the negative logic input terminal of the AND gate 45. Thus, the aforementioned "1" state of the BUSY1 signal is reset to "0" state.

When "1" is set in the bit RSTSND in the control register 3, the address of the register 26 shown in FIG. 6 and the write signal WR are output to the address decoder 20 shown in FIG. 6, and the aforementioned timing signal TMG is generated and input into the AND gate 21, the output of the bit RSTSND is input into the register 26 through the AND gate 24.

The active output RSTSND of the register 26 corresponding to the active output of the AND gate 24, is input into one input terminal of the NOR gate 27, and makes the negative logic output $\overline{\text{RSTFR}}$ of the NOR gate 27 active ("0"). The active signal $\overline{\text{RSTFR}}$ is input into one input terminal of the OR gate 43 shown in FIG. 9, and makes the output of the OR gate 43 active ("1"). The active output of the OR gate 43 makes the output of the AND gate 46 inactive ("0"), i.e., the corresponding output signal SNDOWN of the register 47 becomes inactive.

The inactive SNDOWN signal is input into one of the input terminals of the NOR gate 50 shown in FIG. 8, and the inactive ("1") output signal $\overline{\text{SND0}}$ of the driver 51 is transmitted through the transmission line 71 to the other system B.

The functions of the interface circuit 7' in the system B responding to the above inactive output $\overline{\text{SND0}}$ of the driver 51 which is transmitted through the transmission line 71, are explained with reference to FIGS. 5, 6, 7, 8, and 9.

The above inactive negative logic output $\overline{\text{SND0}}$ of the driver 51 transmitted through the transmission line 71, is received as the negative logic input signal $\overline{\text{SND1}}$ of the receiver 52 shown in FIG. 8, in the interface circuit 7' in the system B. Responding to the above inactive negative logic input signal $\overline{\text{SND1}}$, the output signal SNDY of the receiver 52 becomes inactive ("0"), and the negative logic output $\overline{\text{RSTSND1}}$ of the inverter 54 becomes inactive ("1").

The above inactive output signal SNDY is applied to one of the input terminal of the AND gate 33 shown in FIG. 7 in the system B. When the address of the sense register 6' and the read signal RD are applied to the address decoder 30 in the system B from the processor 2', the above inactive input signal SNDY resets the bit RCV in the sense register 6' in the system B to "0".

The above inactive output $\overline{\text{RSTSND1}}$ of the inverter 54 shown in FIG. 8, is input into the negative logic input terminals of NAND gate 49 shown in FIG. 9, where one input is directly input and the other is input through the register 47. Thus, the negative logic output $\overline{\text{RSTSNDY}}$ of the NAND gate 49 becomes inactive. The above inactive negative logic signal $\overline{\text{RSTSNDY}}$ is input into one of the negative logic input terminals of the OR gate 43 shown in FIG. 9 in the system B.

As mentioned before, in the second embodiment of the present invention, when it is determined that the data which has been sent to the other system and the data which is received from the other system corresponding to the sent data are not equal, the processor sets "1" in the bit FRST in the control register 3. At the same time, the processor 2 outputs the address of the register 26 shown in FIG. 6 and the write signal WR to the address decoder 20 shown in FIG. 6, the aforementioned timing signal TMG is generated based on the aforementioned IPQ signals from the processor and input into the AND gate 21, and thus, the active output of the bit FRST is input into the register 26 through the AND gate 23.

The active output FRST of the register 26 corresponding to the active output of the AND gate 23, is input into one input terminal of the NOR gate 27, and makes the negative logic output $\overline{\text{RSTFR}}$ of the NOR gate 27 active ("0"). The active signal $\overline{\text{RSTFR}}$ is input into one input terminal of the OR gate 43 shown in FIG. 9, and makes the output of the OR gate 43 active ("1"). The active output of the OR gate 43 makes the output of the AND gate 46 inactive ("0"), i.e., the corresponding output signal SNDOWN of the register 47 is made inactive. The inactive SNDOWN signal makes the BUSY1 signal inactive through the OR gate 41 and the AND gate 45.

As explained before, the logical sum of the SNDOWN signal and the FRST signal is sent to the other system through the NOR gate 50 and the driver 51 shown in FIG. 8. The FRST signal which is output from the register 26 shown in FIG. 6 is active ("1") only for a predetermined time, i.e., the FRST signal returns inactive a predetermined time after the FRST signal becomes active, but the above signal SNDOWN becomes inactive, and consequently the inactive output $\overline{\text{SND0}}$ of the driver 51 becomes inactive. The inactive signal $\overline{\text{SND0}}$ is received in the other system as an inactive signal SND1 is transformed to an inactive signal SNDY, and thus, resets the bit RCV in the sense register 6' in the system B, as explained before.

Further, the above-mentioned inactive BUSY1 signal in the system A makes the DTRDY signal in the system B inactive through the driver 51 shown in FIG. 8 in the system A, the transmission line 71, and the receiver 52 as shown in FIG. 8 in the system B.

Namely, all the bits in the sense registers 6 and 6' in both the systems A and B are reset by setting "1" in the FRST bit in the control register 3 in the system which has been in the sender state.

Generally, the above FRST bit in the control register 3 in the second embodiment of the present invention is used for compulsorily resetting both the systems shown in FIG. 4.

Even when the FRST bit in the control register 3' in the system B which has been in the data receiving state is set to "1", all the bits in the sense registers 6 and 6' in both the systems A and B are reset because the active FRST signal makes the $\overline{\text{RSTFR}}$ signal active by the NOR gate 27 shown in FIG. 6, the active $\overline{\text{RSTFR}}$ signal makes the SNDOWN signal inactive through the OR gate 43 and the AND gate 46, and the inactive SNDOWN signal makes both the SND bit and the BUSY bit in the sense register 6, in the other system B "0" through the $\overline{\text{SND0}}$ signal from the system A, the $\overline{\text{RSTSND1}}$ signal generated from the $\overline{\text{SND1}}$, the $\overline{\text{RSTSNDY}}$ signal, the SNWN signal, and the BUSY1 signal, in the construction of FIGS. 5, 6, 7, 8, and 9.

The functions of the FRST bit in the control register 3 or 3' for resetting all the bits in the sense registers 6 and 6' in both the systems A and B before switching to data resending operation, can be realized by using the RSTSND bit in the control register 3 or 3' in the first embodiment of the present invention having the construction shown in FIG. 1, wherein no FRST bit is provided in the control register 39 or 39'. The operation for resetting all bits in the sense registers 6 and 6' is carried out through resetting of the SNDOWN signal in a manner similar to the previously explained second embodiment.

As mentioned before, as each of the interface circuits 70 and 70' of FIG. 1, have a construction similar to the construction shown in FIGS. 5, 6, 7, 8, and 9, except that the construction in FIGS. 5, 6, 7, 8, and 9 relating the FRST bit is not provided in the interface circuits 70 and 70' of FIG. 1, details of the interface circuits 70 and 70' of FIG. 1 are not explained here.

The sequences of data resending according to the embodiments of the present invention are explained below.

According to the present invention, when it is determined that the data which has been sent to the other system and the data which is received from the other system corresponding to the sent data are not equal, the processor sets "1" in the bit RSTSND in the control register 39 in the first embodiment of the present invention, or in the bit FRST in the control register 3 in the second embodiment of the present invention.

In both the first and second embodiments of the present invention, when the system B in the data receiving side receives an inactive $\overline{\text{SND1}}$ caused by a resetting of the SNDOWN signal in the system A in the data sending side before completing a predetermined amount of data transfer, the system B in the data receiving side recognizes that the system A in the data sending side has detected a difference between the data which has been sent to the system B and the data which is received from the system B corresponding to the sent data, and then the system B sends a predetermined response signal to the system A for indicating the system B recognizes that the above difference is detected regarding the last transferred data, and a resending of the data will be carried out. The response signal is, for example, a predetermined pattern which is transmitted from the data register 4' in the system B through the transmission line 73 to the data register 5 in the system A.

Receiving the above predetermined signal, the system A in the data sending side starts the data resending operation, for example, as explained below. First and second types of data resending modes are explained below with reference to FIGS. 10 to 14.

Figure 10:
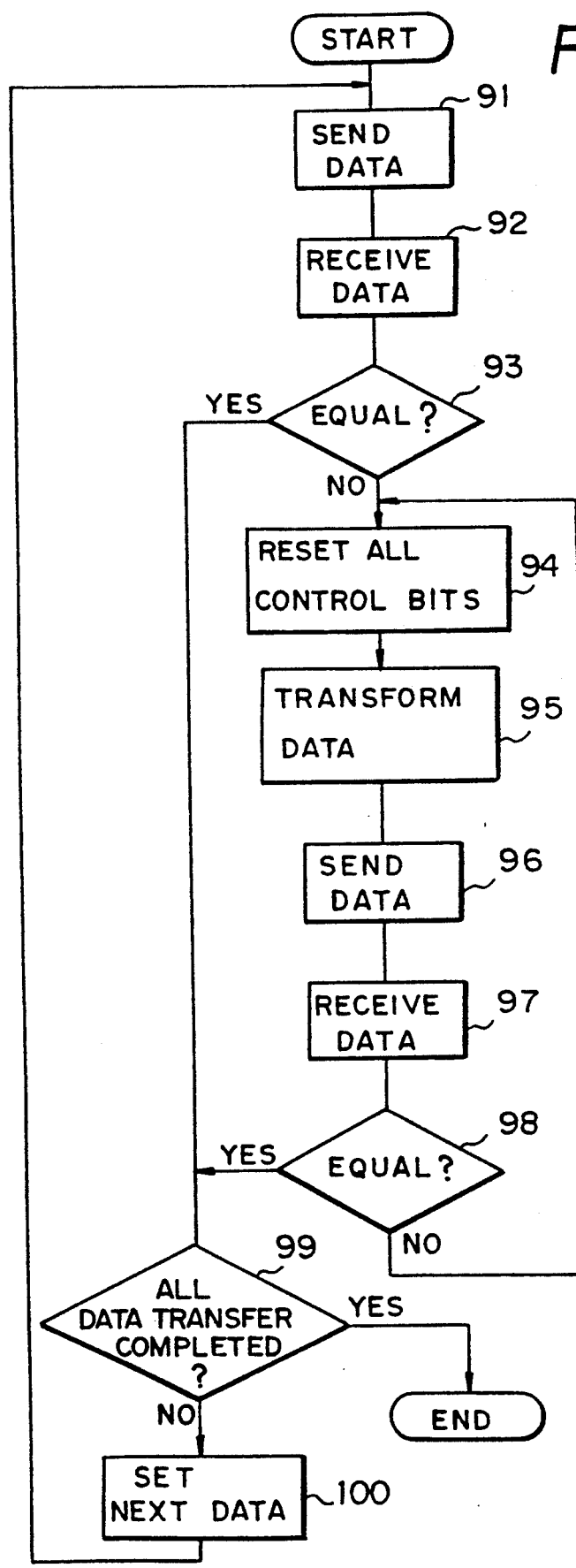
FIG. 10 is a flowchart of a data transfer process including loop checking and data resending of the first mode.

FIG. 10 shows an example of data transfer process including loop checking and data resending in the first mode.

In FIG. 10, the system A transfers a predetermined amount (one byte) of data to the system B in the step 91 in a normal operation, and then the data which is received in the system B and is transferred back to the system A and received by the system A in the step 92.

In the step 93, the system A compares the data which has been sent to the system B in the step 91, with the data received in the step 92. When these data are determined equal in the step 93, it is determined whether or not all of the data which is to be transferred from the system A to the system B has been transferred in the step 99. When it is determined that there is further data which has not been transferred to the system B yet in the step 99, the next predetermined amount (one byte) of data is set in the data register 4 for sending data in the step 100, and the operation goes to the step 91. On the other hand, when it is determined that all of the data which is to be transferred from the system A to the system B has been transferred in the step 99, the operation of FIG. 10 is completed.

When the above data compared in the step 93 are determined not equal, the data which has been sent to the system B in the step 91 is resent. The aforementioned operation for switching to resending process is carried out, i.e., the processor 2 sets "1" in the bit RSTSND in the first embodiment of the present invention (FIG. 1), or in the bit FRST in the second embodiment of the present invention (FIG. 4) in the step 94. As mentioned before, initiated by the above setting of the bit RSTSND or FRST in the control register 39 or 3, all bits in the sense registers 6 and 6, in both the systems are reset.

Then, in the step 95, the last data regarding which the above inequality has been determined, is transformed in a predetermined manner. Next, in the step 96, the transformed data is sent to the system B.

The data which is transformed, the step 95 and is transferred to the system B, and then transferred back to the system A. In the step 97, the data transferred from the system B is received by the system A.

The above transformation is such that a portion of the predetermined amount of data which has been sent last is inverted, and the portion of the bits inverted is changed for each resending operation of the steps 94 to 98, while the operations of the steps 94 to 98 are repeated until an equality between compared data is determined in the step 98 as explained below. FIG. 11 shows an example of data transformations in a data resending process which can be used in the first and second embodiments of the present invention.

In the step 98, the system A (the processor 2) compares the data which has been sent to the system B in the step 96 with the data received in the step 97, and determines whether or not both the data are equal. When these data are determined equal in 98, the operation goes to the step 99. It is then determined whether or not all amount of data which is to be transferred from the system A to the system B has been transferred in the step 99. When it is determined that there is further data which has not been transferred to the system B yet in the step 99, the next predetermined amount (one byte) of data is set in the data register 4 for sending data in the step 100, and the operation goes to the step 91. On the other hand, when it is determined that all of the data which is to be transferred from the system A to the system B has been transferred in the step 99, the operation of FIG. 10 is completed.

When the above data compared in the step 98 are determined not equal, the operation goes to the step 94 The operation of the step 94 is carried out for indicating a beginning of each resending operation.

The difference between the data which has been sent to the other system B and the data which is received from the other system B corresponding to the sent data in the step 93 means that a portion of the bits in the correct data are inverted due to an error. The error is caused by one or more transient causes occurring in the loop comprised of the transmission line 72 from the system A in the data sending side to the system B in the data receiving side and the transmission line 73 from the system B in the data receiving side to the system A in the data sending side, either a transient noise in the loop or a lasting cause, either a break of a part of or all of the data transmission lines in the loop.

If the cause of the error is transient, the data which has been sent to the system B in the step 96 and received in the step 97 will be equal in the resending and loop checking operation if another transient error does not occur during the resending and loop checking operation.

When the cause of the error is lasting, each value of a portion of bits will be fixed to "0" or "1" regardless of the transmitted data. The data which has been sent from the system at the system B in the step 96, and the data received from the system B in the system A in the step 97 will be equal in a resending and loop checking operation wherein the portion of bits which are inverted in the step 95 is identical with the above portion of bits which will be fixed to "0" or "1" due to the above lasting cause.

Figure 12:
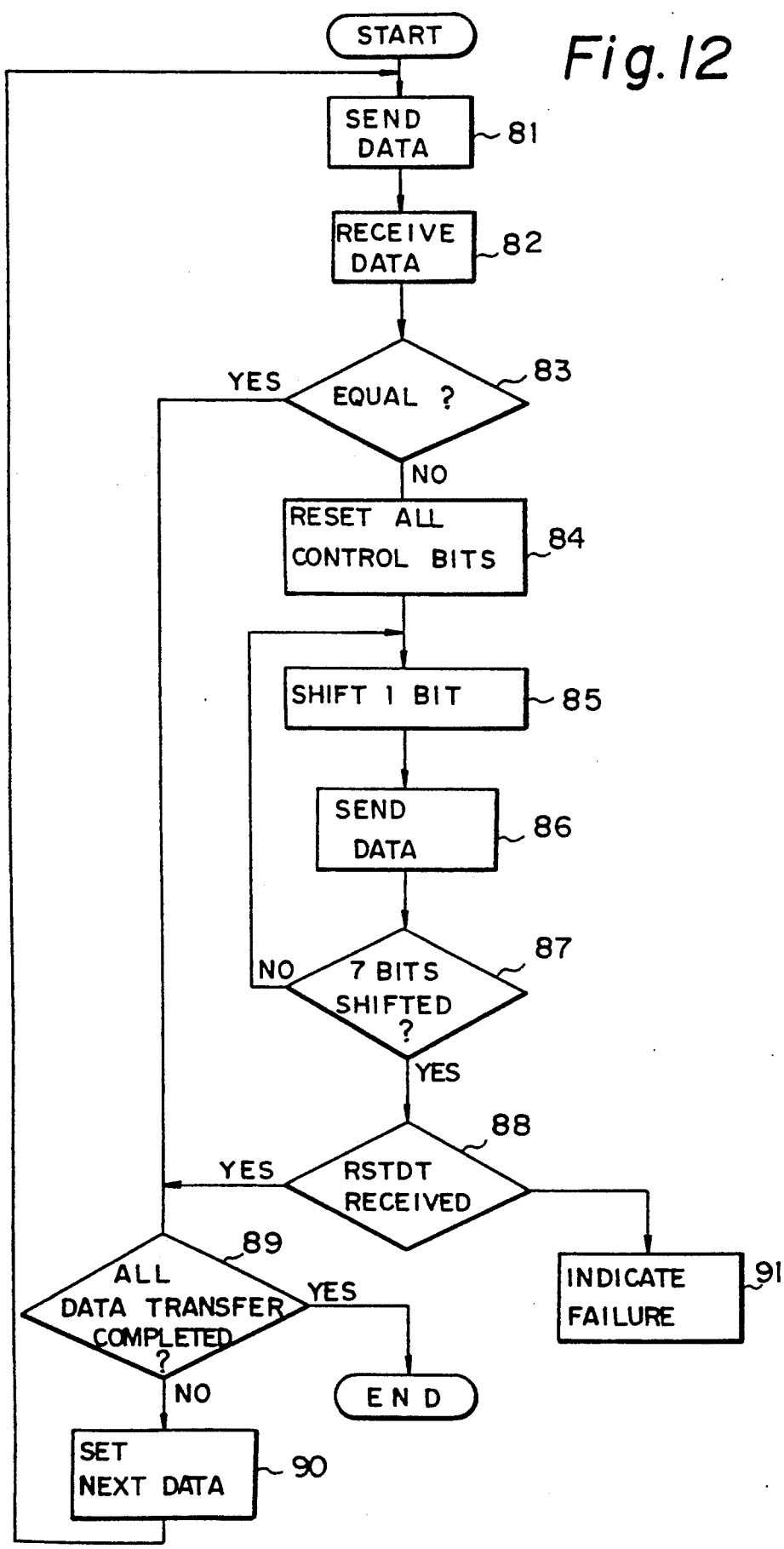

FIG. 12 shows an example of data transfer process including loop checking and data resending in the second mode.

In FIG. 12, the system A transfers a predetermined amount (one byte) of data to the system B in the step 81 in a normal operation, and then the data which is received in the system B and is transferred back to the system A and received by the system A in the step 82.

In the step 83, the system A compares the data which has been sent to the system B in the step 81 with the data received in the step 82. When these data are determined equal in the step 83, it is determined whether or not all of the data which is to be transferred from the system A to the system B has been transferred in the step 89. When it is determined that there is further data which has not been transferred to the system B yet in the step 89, the next predetermined amount (one byte) of data is set in the data register 4 for sending data in the step 90, and the operation goes to the step 81. On the other hand, when it is determined that all of the data which is to be transferred from the system A to the system B has been transferred in the step 89, the operation of FIG. 12 is completed.

When the above data compared in the step 83 are determined not equal, the data which has been sent to the system B in the step 81 is re-sent. The aforementioned operation for switching to resending process is carried out, i.e., the processor sets "1" in the bit RSTSND in the first embodiment of the present invention (FIG. 1), or in the bit FRST in the second embodiment of the present invention (FIG. 4) in the step 84. As mentioned before, initiated by the above setting of the bit RSTSND or FRST in the control register 39 or 3, all bits in the sense registers 6 and 6, in both the systems are reset. The operation of the step 84 is carried out for indicating a beginning of each resending operation.

Then, in the step 85, each bit of the last data sent regarding which the above inequality has been determined, is cyclically shifted to the left by one bit. Next, in the step 86, the transformed data is sent to the system B.

The data which is cyclically shifted by one bit in the step 85 is transferred in the system B, and then transferred back to the system A. In the step 87, it is determined whether or not the accumulated number of the bit shift has reached to seven. When it is determined that the accumulated number of the bit shift has not reached to seven, the operation goes to the step 85. If it is determined that the accumulated number of the bit shift has reached to seven, the operation goes to the step 89.

In the step 89, it is determined whether or not all of the data which is to be transferred from the system A to the system B has been transferred. When it is determined that there is further data which has not been transferred to the system B yet in the step 89, the next predetermined amount (one byte) of data is set in the data register 4 for sending in the step 90 and the operation goes to the step 81. On the other hand, when it is determined that all of the data which is to be transferred from the system A to the system B has been transferred in the step 89, the operation of FIG. 12 is completed.

Thus, in the data resending operation in the steps 85 to 87, the original data which has been transferred to the system B in the step 81 are further resent to the system B seven times so that consequently the original data is transferred to the system B in all the possible cyclically shifted arrangements. The original data and all the possible cyclically shifted arrangements are shown in FIG. 13.

FIG. 14 shows an example of a set of the resent data in the above data resending process in FIG. 12, when data is (0 0 0 0 0 0 0 1), and the sixth in the loop comprised of the transmission line 72 from the system A in the data sending side to the system B in the data receiving side, and the transmission line 73 from the system B in the data receiving side to the system A in the data sending side, is broken.

As shown in the example of FIG. 14, when the eight bytes of data which are generate from the original data, including all possible cyclically shifted arrangements, are provided, the processor 2' in the system B in the data receiving side may be able to determine the correct original data of one byte, depending on the original data, the portion of bits having a fault in the loop, and the nature of the fault, e.g., whether the fault is transient or lasting.

If the cause of the error is transient, in the above-mentioned set of eight bytes data which has been sent to the system B in the steps 85 to 87, the error appears as a worm hole in the regular oblique pattern which is similar to the pattern of FIG. 14.

When the cause of the error is lasting, each value of a portion of bits will be fixed to "0" or "1" regardless of the transmitted data. Therefore, one or more vertical lines wherein all values are fixed to "0" or "1" due to the above lasting cause appear in a pattern of the above-mentioned set of eight-byte data which has been sent to the system B in the steps 85 to 87 as shown in FIG. 14.

When the processor 2' in the system B determines that the correct original data can be determined based on the received set of eight-byte data, the processor 2' sets "1" in the bit RSTDT in the control register 39' or 3' in the system B in the first and second embodiments, respectively. On the other hand, when the processor 2' in the system B determines that the correct original data cannot be determined based on the received of eight-byte data, the processor 2' informs the system A that the correct original data cannot be determined based on the received of eight-byte data, by setting "1" in the bit FRST in the control register 3' in the second embodiment in the system B, or by transferring predetermined data indicating the above failure in determining the control data to the system A' in the first embodiment of the present invention.

In the step 88 shown in FIG. 12, the system A (the processor 2) determines by the above information whether or not the correct original data can be determined in the system B based on the received of eight-byte data. When it is determined that the correct original data can be determined in the system B, the operation goes to the step 89 as discussed above. On the other hand, when it is determined that the correct original data cannot be determined in the system B. the operation goes to the step 91 to indicate a failure in recognizing the correct data in the system B which informs an operator of the failure.

What is claimed is:
1. A data transfer process for transferring data from a first system to a second system and carryout out loop checking, said process comprising the steps of:
  (a) sending a part of the data from the first system to the second system;
  (b) sending first information, from the first system to the second system, in response to said sending of the part of the data from the first system in step (a);
  (c) reading the part of the data received in the second system when the first information is sent to the second system;
  (d) sending the part of the data read in step (c) from the second system to the first system in response to said reading in step (c) to the first system;
  (e) sending second information, from the second system to the first system, in response to said sending of the part of the data from the second system in step (d);
  (f) reading the part of the data sent from the second system and received in the first system when the second information is sent to the first system in step (e);
  (g) determining whether the part of the data sent from the first system in step (a) and the part of the data read in the second system in step (f) are equal;
  (h) resending the part of the data sent from the first system in step (a) to the second system when it is determined, in step (g), that the part of the data sent from the first system in step (a) and the part of the data read in the first system in step (f) are not equal, said resending comprising the substeps of:
    (h1) transforming the part of the data sent out in a preceding sending operation from the first system to the second system in a predetermined manner to produce a transformed part of the data;
    (h2) sending gout the transformed part of the data from the first system to the second system;
    (h3) sending third information, from the first system to the second system, that the transformed part of the data has been sent out in step (h2);
    (h4) receiving the transformed part of the data sent in step (h2) in the second system;
    (h5) sending out the transformed part of the data received in step (h4) from the second system to the first system;

(h6) sending fourth information, from the second system to the first system, that the transformed part of the data has been sent out from the second system to the first system in step (h5);

(h7) receiving the transformed part of the data sent from the second system in step (h51);

(h8) determining whether the transformed data sent out from the first system in step (h2) and the transformed data received in the first system in step (h7) are equal;

(h9) returning to step (h1) when the transformed data sent out from the first system in step (h2) and the transformed data received in the first system in step (h7) are not equal; and (h10) continuing with step (i) when the transformed data sent out from the first system in step (h2) and the transformed data received in the first system in step (h7) are equal; and (i) repeating steps (a)–(h) for another part of the data until all of the data has been transferred to the second system.

2. A data transfer process according to claim 1, wherein said transforming in step (h1) comprises the step of inverting one or more bits in the part of the data sent out in the preceding sending operation from the first system to the second system.

3. A data transfer process for transferring data from a first system to a second system can carrying out loop checking, said process comprising the steps of:

(a) sending a part of the data from the firs system to the second system;

(b) sending first information, from the first system to the second system, in response to said sending of the part of the data from the first system in step (a);

(c) reading the part of the data received in the second system when the first information is sent to the second system;

(d) sending the part of the data read in step (c) from the second system to the first system in response to said reading in step (c);

(e) sending second information, from the second system to the first system, in response to said sending of the part of the data from the second system in step (d);

(f) reading the part of the data sent from the second system and received in the first system when the second information is sent to the first system in step (e);

(g) determining whether the part of the data sent from the first system in step (a) and the part of the data read in the second system in step (f) are equal;

(h) resending the part of the data sent from the first system in step (a) to the second system when it is determined, in step (g), that the part of the data sent from the first system in step (a) and the part of the. data read in the first system in step (f) are not equal, said rending including the substeps of:

(h1) generating possible bit patterns which can be generated by cyclic bit shifting the part of the data;

(h2) sending out the possible bit patterns generated in step (h1) from the first system to the second system;

(h3) receiving the possible bit patterns sent in step (h2) in the second system;

(h4) determining whether or not the part of the data sent out from the first system in step (a) can be correctly recognized based on the data received in step (h3);

(h5) proceeding to step (h1) when the part of the data sent out in step (i) cannot be correctly recognized based on the data sent in step (h2); and (h6) proceeding the step (i) when the part of the data sent out in step (a) can be correctly recognized based on the data sent in step (h2); and (i) repeating steps (a)–(h) for another part of the data until all of the data has been transferred to the second system.

4. A data transfer process according to claim 3, wherein step (h) further comprises the step of indicating a failure to correctly recognize the data in the second system.

5. A data processing system for transferring data from a first system to a second system, the first system of said data processing system comprising:

first means for sending a part of the data from the first system to the second system;

second means for sending first information that the part of the data has been sent from the first system by said first means to the second system, in response to operation of said first means;

third means for receiving second information sent from the second system that the part of the data responding to the operation of said first means has been received, after completion of the sending by said second means;

fourth means for reading the part of the data received from the second system in the first system, after completion of the receiving by said third means;

fifth means for determining whether the part of the data sent by said first means and the part of the data received and read by said fourth means are equal, after the reading by said fourth means is completed;

sixth means for resending the part of the data sent from the first system by said first means to the second system when said fifth means determines that the part of the data sent from the first system by said first means and the part of the data received and read by said fourth means are not equal, after the operation of said fifth means, wherein said sixth means includes:

seventh means for transforming the part of the data sent out in a preceding sending operation from the first system to the second system in a predetermined manner to produce a transformed part of the data;

eighth means for sending out the transformed part of the data transformed by said seventh mean from the first system to the second system;

ninth means for sending third information, from the first system to the second system, that the transformed part of the data has been sent out from said eighth means, after the operation of said eighth means;

tenth means for receiving fourth information from the second system that the transformed part of the data responding to the operation of said first means has been received and sent out from the second system after the operation of said ninth means;

eleventh means for receiving the transformed part of the data sent from the second system, after the operation of said tenth means;

twelfth means for determining whether the transformed data sent out from the first system by said eighth means and the transformed data received by said eleventh means are equal;

thirteenth means for controlling activation of said seventh means when the transformed data sent out by said eighth means and the transformed data received by said eleventh means are not equal; and fourteenth means for controlling activation of said first means when the transformed data sent out by said eighth means and the transformed data received in by said eleventh mean are equal; and control means for controlling said first to sixth means to repeat the operations of said first to sixth means for sending another part of the data until all of the data has been transferred to the second system.

6. A data processing system according to claim 5, wherein the transforming by said seventh means comprises bit inverting means for inverting one or more bits in the part of the data sent out in the preceding sending operation from the first system to the second system.

7. A data processing system for transferring data from a first system to a second system, the first system of said data processing system comprising:

first means for sending a part of the data from the first system to the second system;

second means for sending first information that the part of the data has been sent from the first system by said first means to the second system, in response to the operation of said first means;

third means for receiving second information sent from the second system that the part of the data responding to the operation of said first means has been received, after the operation of said second means;

fourth means for reading the part of the data received from the second system in the first system, after the operation of said third means;

fifth means for determining whether or not the part of the data sent by said first means and the part of the data received and read by said fourth means are equal, after the operation of said fourth means;

sixth means for resending the part of the data sent from the first system by said first means to the second system when it is determined, by said fifth means, that the part of the data sent from the first system by said first means and the part of the data received and read by said fourth means are not equal, after the operation of said fifth means, wherein said sixth means includes:

seventh means for generating possible bit patterns by cyclic bit shifting the part of the data;

eighth mean for sending out the possible bit patterns generated by said seventh means for the first system to the second system;

ninth means for receiving information from the second system regarding whether the part of the data sent out by said first means can be correctly recognized based on data sent by said eighth means;

tenth means for proceeding to said eighth means when the part of data sent out by said first means cannot be correctly recognized yet based on the data sent by said eighth means; and eleventh means for proceeding to said first mean when the part of data sent out by said first means can be correctly recognized based on the data sent by said eighth means; and control means for controlling said first to sixth means to repeat the operations of said first to sixth means for sending another part of the data until all of the data has been transferred to the second system.

8. A data transfer process according to claim 7, wherein said eighth means further comprises means for indicating a failure to correctly recognize the data in the second system.

9. A data transfer system for transferring data from a first system to a second system while carrying out loop checking, said system comprising:

first means for sending a part of the data from the first system to the second system;

second means for sending first information, from the first system to the second system, in response to the sending of the part of the data from the first system by the first means;

third means for reading the part of the data received the second system when the first information is sent o the second system;

fourth means for sending the part of the data read by said third means from the second system in response to the reading by said third means to the first system;

fifth means for sending second information, from the first system to the second system, in response to the sending of the part of the data from the second system by said fourth means;

sixth means for inputting the part of the data sent from the second system in the first system when the second information is sent to the first system by said fifth means;

seventh mean for determining whether the part of the data sent from the first system by said first means and the part of the data received and read in the second system by said sixth means are equal;

eighth means for resending the part of the data sent from the first system by said first means to the second system when it is determined, by said seventh means, that the part of the data sent from the first system by said first means and the part of the data received and read in the first system by said sixth means are not equal, wherein said eighth means includes:

ninth means for transforming the part of the data sent out in a preceding sending operation from the first system to the second system in a predetermine manner to produce a transformed part of the data;

tenth means for sending out the transformed part of the data from the first system to the second system;

eleventh means for sending third information, from the first system to the second system, that the transformed part of the data has been sent out by said ninth means;

twelfth means for receiving the transformed part of the data, sent from the first system by said tenth means, in the second system;

thirteenth means for sending gout the transformed part of the data received by the twelfth means from the second system to the first system;

fourteenth means for sending fourth information, from the second system to the first system, that the transformed part of the data has been sent out from the second system by said thirteenth means;

fifteenth means for receiving the transformed part of the data, sent from the second system by said thirteenth means, in the first system;

sixteenth means for determining whether the transformed data sent out from the first system by said tenth means and the transformed data received in the first system by said fifteenth means are equal;

seventeenth means for activating said ninth means when the transformed data sent out from the first system by said tenth means and the transformed data received in the first system by said fifteenth means are not equal; and eighteenth means for activating said first means when the transformed data sent out from the first system by said tenth means and the transformed data received in the first system by said fifteenth means are equal; and control means for controlling said first to eight means to repeat the transferring of the data from another part of the data until all of the data has been transferred to the second system.

10. A data transfer system according to claim 9, wherein said ninth means comprises a bit inverting means for inverting one or more bits in the part of the data sent out in the preceding sending operation from the first system to the second system.

11. A data transfer system for transferring data from a first system to a second system while carrying out loop checking, said system comprising:

first means for sending a part of the data from the first system to the second system;

second means for sending first information, from the first system to the second system, in response to the sending of the part of the data from the first system by the first means;

third means for reading the part of the data received the second system when the first information is sent to the second system;

fourth means for sending the part of the data read by said third means from the second system to the first system in response to the reading y said third means;

fifth means for sending second information, from the first system to the second system, in response to the sending of the part of the data from the second system by said fourth means;

sixth means for inputting the part of the data sent from the second system to the first system when the second information is sent to the first system by said fifth means;

seventh means for determining whether the part of the data sent from the first system by said first means and the part of the data input by said sixth means in the first system are equal;

eighth means for resending the part of the data sent from the first system by said first means to the second system when it is determined, by said seventh means, that the part of the data sent from the first system by said first means and the part of the data input by said sixth means in the first system are not equal, wherein said eighth means includes:

ninth mean for generating possible bit patterns by cyclic bit shifting the part of the data;

tenth means for sending out the possible bit patterns generated by said ninth means from the first system to the second system;

eleventh means for receiving the possible bit patterns, sent by said tenth means, in the second system;

twelfth means for determining whether the part of the data sent out from the first system by said first means can be correctly recognized based on data received by said eleventh means;

thirteenth means for activating said ninth means when the part of the data sent out from the first system by said first means cannot be correctly recognized based on the data sent by said tenth means; and fourteenth means for activating said first means when the part of the data sent out from the first system by said first means can be correctly recognized based on the data sent by said tenth means; and control means for controlling said first to eighth means to repeat the transferring of the data for another part of the data until all of the data has been transferred to the second system.

12. A data transfer system according to claim 11, wherein said ninth means further comprises means for indicating a failure to correctly recognize the data in the second system.

13. A data transfer system for transferring data, said transfer system comprising:

first and second data transmission/reception means; and transmission means for operatively connecting said first and second data transmission/reception means;

said first data transmission/reception means for transmitting data to and receiving data from said second data transmission/reception means, said first data transmission/reception means includes:

first output control register means for storing first output control information to be transmitted to said second data transmission/reception means;

first input control register means for receiving second output control information from said second data transmission/reception means;

first data output register means for storing a part of the data to be transmitted;

first data input register means for receiving a return part of the data transmitted by said second data transmission/reception means; and first control mean for controlling transmission of the first output control information to said second data transmission/reception means, for controlling the transmission of the data to said second data transmission/reception means in a plurality of parts and for performing data check to verify proper receipt of each of the parts of the data at said second data transmission/reception means until all of the plurality of parts for the data to be transmitted are correctly received by said second data transmission/reception means;

and wherein said first control means includes:

means for setting the part of the data to be transmitted in said first data output register means;

means for setting the first output control information in said first output control register means;

comparison means for comparing the return part of the data stored in said first data input register means with the part of the data stored in said first data output register means; and data resend means for resending the part of the data stored in said first data output register mean when said comparison means determines that the return part of data transmitted by said second data transmission/reception system is not equal to the part of the data stored in said first data output register means, for transforming the part of the data to be transmitted into a transformed part and for resending the transformed part to said second data transmission/reception means as the part of the data to be transmitted;

said second data transmission/reception means for receiving the part of the data and the first output control information from said first data transmission/reception means, for transmitting the second output control information, and for transmitting the part of the data received as the return part of the data.

14. A data transfer system according to claim 13, wherein said second data transmission/reception means comprises:

second output control register means for storing the second output control information from said second data transmission/reception system; and second input control register means for storing the first output control information transmitted by said first data transmission/reception system.

15. A data transfer system according to claim 13, wherein the part of the data includes a plurality of bits, and wherein said transforming means transforms the part of the data by one of shifting at least one of the bits and inverting at least one of the bits.

* * * * *

UNITED STATES PATENT AND TRADEMARK OFFICE
CERTIFICATE OF CORRECTION

PATENT NO. : 5,193,093
DATED : March 9, 1993
INVENTOR(S) : OKAZAKI

It is certified that error appears in the above-indentified patent and that said Letters Patent is hereby corrected as shown below:

Title page: Delete the Abstract and insert the following new Abstract:

[57] ABSTRACT

Data is transferred from a first system to a second system with loop checking by being sent in successive parts, each part in a sequence of eight steps. A first step sends a part of the above data from the first to the second system; a second step sends first information that the above data part has been sent, in the first step, from the first to the second system; a third step receives the above data part in the second system; a fourth step sends the above data part, received in the third step, from the second to the first system, just after the third step; a fifth step sends second information that the above data part has been sent, in the fourth step, from the second to the first system; a sixth step receives the above data part, sent from the second system, in the first system; a seventh step determines whether or not the above data part, sent from the first system in the first step, and the data part, received in the second system in the sixth step, are equal; and an eighth step re-sends the above data part, sent from the first system in the first step, to the second system when it is determined, in the seventh step, that the above data part sent from the first system in the first step and the data part received in the first system in the sixth step are not equal.

Col. 2, line 64, change "transfer o" to --transfer operations--;
line 67, delete "the".

Col. 3, line 24, after "second" insert --system; an--;
line 32, before "fourteenth" insert --a--.

UNITED STATES PATENT AND TRADEMARK OFFICE
CERTIFICATE OF CORRECTION

PATENT NO. : 5,193,093

DATED : March 9, 1993

INVENTOR(S) : OKAZAKI

It is certified that error appears in the above-indentified patent and that said Letters Patent is hereby corrected as shown below:

Col. 4, line 17, change "black" to --block--.

Col. 17, line 20, change "signals" to --signal--.

Col. 20, line 23, after "96" delete the comma (",").

Col. 21, line 19, after "sending" insert --data--.

Col. 22, line 7, change "A'" to --A--.

Col. 23, line 31, change "firs" to --first--.

Signed and Sealed this

Twenty-sixth Day of April, 1994

Attest:

BRUCE LEHMAN

*Attesting Officer*   *Commissioner of Patents and Trademarks*